United States Patent
Hyakudai et al.

(10) Patent No.: US 12,413,327 B2
(45) Date of Patent: Sep. 9, 2025

(54) COMMUNICATION APPARATUS AND COMMUNICATION SYSTEM

(71) Applicant: Sony Semiconductor Solutions Corporation, Kanagawa (JP)

(72) Inventors: Toshihisa Hyakudai, San Diego, CA (US); Satoshi Ota, Kanagawa (JP); Junya Yamada, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 159 days.

(21) Appl. No.: 18/100,831

(22) Filed: Jan. 24, 2023

(65) Prior Publication Data

US 2023/0254059 A1 Aug. 10, 2023

Related U.S. Application Data

(60) Provisional application No. 63/389,108, filed on Jul. 14, 2022, provisional application No. 63/306,633, filed on Feb. 4, 2022.

(51) Int. Cl.
*H04J 3/16* (2006.01)

(52) U.S. Cl.
CPC .................. *H04J 3/1676* (2013.01)

(58) Field of Classification Search
CPC ....... H04N 21/43635; H04N 21/43615; H04N 21/4367; H04N 21/440218; H04N 21/64322; H04N 21/43637; G09G 5/006; G09G 2370/12; G09G 2370/18; G02B 6/4246; G02B 6/4201; H04B 10/801; H01S 5/18313; H01S 5/3095; H01S 5/0262; H01S 5/04257; H01S 5/02; H01S 5/02212; H01S 5/005; H04J 14/08

See application file for complete search history.

(56) References Cited

U.S. PATENT DOCUMENTS

| | | | |
|---|---|---|---|
| 7,860,398 B2 * | 12/2010 | Tatum | G09G 5/006 398/139 |
| 8,233,805 B2 * | 7/2012 | Tatum | G09G 5/006 398/139 |

(Continued)

FOREIGN PATENT DOCUMENTS

| | | |
|---|---|---|
| JP | 2008515343 A | 5/2008 |
| JP | 2011-239011 A | 11/2011 |
| WO | WO-2017085968 A1 | 5/2017 |

OTHER PUBLICATIONS

Dalma, Kanal, ASA Mot1onLrnk—Tutorial [online ],—ASA Publications, Sep. 29, 2021, pp. 1-16, [ : Mar. 29, 2023 ] , <URL https•//auto-serdes.org/wp-content/upl oads/2022/08/ ASA-tutori al - Sep. 2021. pdf > p. 5.

(Continued)

*Primary Examiner* — Jung Liu
(74) *Attorney, Agent, or Firm* — Michael Best & Friedrich LLP

(57) ABSTRACT

A communication apparatus includes: an encoder that generates a packet of a time division duplex (TDD) communication system, the packet including a high-definition multimedia interface (HDMI) signal; and a communication unit that transmits the packet to a communication partner device for each of a plurality of divided periods obtained by dividing one TDD burst period in the TDD communication system.

19 Claims, 48 Drawing Sheets

(56) References Cited

U.S. PATENT DOCUMENTS

| | | | |
|---|---|---|---|
| 9,749,682 B2* | 8/2017 | Rabii | H04N 21/440218 |
| 10,021,615 B2* | 7/2018 | Nabhane | H04W 36/00698 |
| 10,762,875 B2* | 9/2020 | Suzuki | G09G 5/18 |
| 2008/0239082 A1* | 10/2008 | Zhu | G01R 31/3167 |
| | | | 348/181 |
| 2011/0091219 A1* | 4/2011 | Tatum | G09G 5/006 |
| | | | 398/142 |
| 2016/0366470 A1* | 12/2016 | Rabii | H04N 21/43635 |
| 2017/0245189 A1* | 8/2017 | Nabhane | H04W 36/00698 |
| 2019/0041918 A1* | 2/2019 | Larsen | G06F 1/1635 |
| 2019/0043446 A1* | 2/2019 | Suzuki | G06F 3/1431 |

OTHER PUBLICATIONS

Dalmia Kamal et al: "TDD-based Asymmetrical Ethernet Physical Layer for Automotive Applications : IEEE Conference Publication { IEEE Xplore",May 27, 2022 (May 27, 2022), pp. 1-5,XP093262766.

* cited by examiner

FRL data rate per lane

| Rate per Lane | Number of Lanes |
|---|---|
| 3 Gbps | 3 |
| 6 Gbps | 3 |
| 6 Gbps | 4 |
| 8 Gbps | 4 |
| 10 Gbps | 4 |
| 12 Gbps | 4 |

FIG.4

ASA data rate

|     | Down link | Up link |
| --- | --- | --- |
|     | DLL payload data rate [Gpbs] | |
| SG1 | 1.8 | 0.05 |
| SG2 | 3.6 | 0.10 |
| SG3 | 6.4 | - |
| SG4 | 9.7 | - |
| SG5 | 13.0 | - |

FIG.9 number of PHY data block per TDD cycle

|     | Number of PHY data block/TDD cycle |
|-----|------------------------------------|
| SG3 | 36                                 |
| SG4 | 54                                 |
| SG5 | 72                                 |

HDMI transmission capability with ASA multi-lane

| Max total bit rate [Gbps] | | | 1 lane | | | | | 2 lanes | | | | | 4 lanes | | | | |
|---|---|---|---|---|---|---|---|---|---|---|---|---|---|---|---|---|---|
| | | | SG1 | SG2 | SG3 | SG4 | SG5 | SG1 | SG2 | SG3 | SG4 | SG5 | SG1 | SG2 | SG3 | SG4 | SG5 |
| | | | 1.8 | 3.6 | 6.4 | 9.7 | 13.0 | 3.6 | 7.2 | 12.8 | 19.4 | 26.0 | 7.2 | 14.4 | 25.6 | 38.8 | 52 |
| HDMI 1.4b | TMDS | 10.2 | OK | OK | OK | OK | NA | OK | OK | NA | NA | NA | OK | NA | NA | NA | NA |
| HDMI2.0 | TMDS | 18.0 | OK | OK | OK | OK | OK | OK | OK | OK | NA | NA | OK | OK | NA | NA | NA |
| HDMI2.1 | FRL 3G x 3 | 9.0 | OK | OK | OK | NA | NA | OK | OK | NA | NA | NA | OK | NA | NA | NA | NA |
| | FRL 6G x 3 | 18.0 | OK | OK | OK | OK | OK | OK | OK | OK | NA | NA | OK | OK | NA | NA | NA |
| | FRL 6G x 4 | 24.0 | OK | OK | OK | OK | OK | OK | OK | OK | OK | NA | OK | OK | NA | NA | NA |
| | FRL 8G x 4 | 32.0 | OK | OK | OK | OK | OK | OK | OK | OK | OK | OK | OK | OK | OK | NA | NA |
| | FRL 10G x 4 | 40.0 | OK | OK | OK | OK | OK | OK | OK | OK | OK | OK | OK | OK | OK | OK | NA |
| | FRL 12G x 4 | 48.0 | OK | OK | OK | OK | OK | OK | OK | OK | OK | OK | OK | OK | OK | OK | OK |

HDMI transmission capability with ASA multi-lane (2)

| Max total bit rate [Gbps] | | | 1 lane | | | | | 2 lanes | | | | | 4 lanes | | | | |
|---|---|---|---|---|---|---|---|---|---|---|---|---|---|---|---|---|---|
| | | | SG1 | SG2 | SG3 | SG4 | SG5 | SG1 | SG2 | SG3 | SG4 | SG5 | SG1 | SG2 | SG3 | SG4 | SG5 |
| | | | 1.8 | 3.6 | 6.4 | 9.7 | 13.0 | 3.6 | 7.2 | 12.8 | 19.4 | 26.0 | 7.2 | 14.4 | 25.6 | 38.8 | 52 |
| HDMI 1.4b | TMDS | 10.2 | NA | NA | NA | NA | OK | NA | NA | OK | OK | OK | NA | DU | OK | OK | OK |
| HDMI2.0 | TMDS | 18.0 | NA | NA | NA | NA | NA | NA | NA | NA | OK | OK | NA | NA | OK | OK | OK |
| HDMI2.1 | FRL 3G x 3 | 9.0 | NA | NA | NA | DU | OK | NA | NA | OK | OK | OK | NA | DU | OK | OK | OK |
| | FRL 6G x 3 | 18.0 | NA | NA | NA | NA | NA | NA | NA | NA | OK | OK | NA | NA | OK | OK | OK |
| | FRL 6G x 4 | 24.0 | NA | NA | NA | NA | NA | NA | NA | NA | NA | OK | NA | NA | OK | OK | OK |
| | FRL 8G x 4 | 32.0 | NA | NA | NA | NA | NA | NA | NA | NA | NA | NA | NA | NA | NA | OK | OK |
| | FRL 10G x 4 | 40.0 | NA | NA | NA | NA | NA | NA | NA | NA | NA | NA | NA | NA | NA | NA | OK |
| | FRL 12G x 4 | 48.0 | NA | NA | NA | NA | NA | NA | NA | NA | NA | NA | NA | NA | NA | NA | OK |

NA: not available, DU: don't use

FIG.16 total number of PHY data block of ASA

|  |  | total number of PHY data block | | |
|---|---|---|---|---|
|  |  | 1 | 2 | 4 |
|  |  |  |  |  |
|  |  |  |  |  |
| SG3 | 36 |  | 72 | 144 |
| SG4 | 54 |  | 108 | 216 |
| SG5 | 72 | 72 | 144 | 288 |

DDC packet structure

| byte# | bit | function |
|---|---|---|
| 1 | 7 | reserved |
| | 6 | I2C error |
| | 5 | reserved |
| | 4 | I2C data flag |
| | 3 | I2C Nack |
| | 2 | I2C ACK |
| | 1 | I2C Stop |
| | 0 | I2C Start/Restart |
| 2 | 7:0 | I2C data |

FIG.27

CEC packet

| Byte | bit | Name |
|---|---|---|
| 1 | 7 | Num of CEC data |
| | 6:4 | reserved |
| | 3 | CEC[0] |
| | 2 | CEC[1] |
| | 1 | CEC[2] |
| | 0 | CEC[3] |
| 1+n | 7 | CEC[8*(n-1)+4] |
| | 6 | CEC[8*(n-1)+5] |
| | 5 | CEC[8*(n-1)+6] |
| | 4 | CEC[8*(n-1)+7] |
| | 3 | CEC[8*(n-1)+8] |
| | 3 | CEC[8*(n-1)+9] |
| | 1 | CEC[8*(n-1)+10] |
| | 0 | CEC[8*(n-1)+11] | n=1,2,3

CEC packet structure

FIG.30

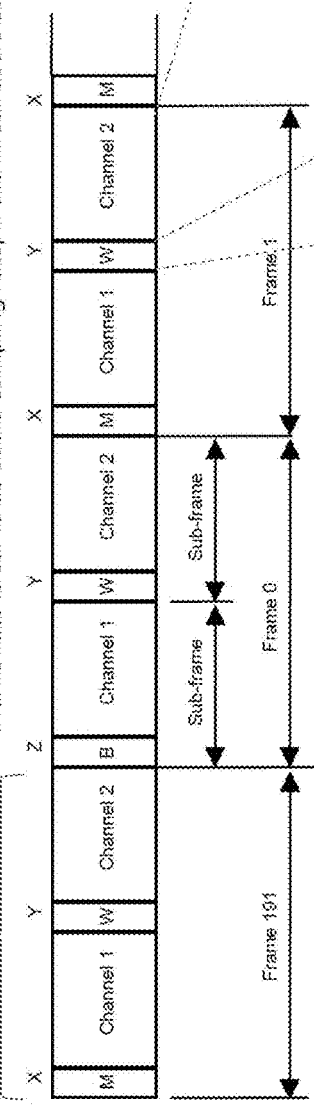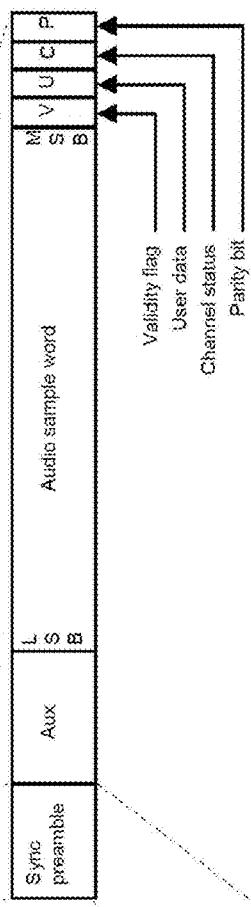
FIG.33

ARC data (IEC 6-0958 sub frame) packet

| Byte | bit | Name | Description |
|---|---|---|---|
| 1 | 7:4 | auxiliary sample bit [3:0] | this field conveys 4 bits in the time slots 4 to 7 of IEC 60958 SubFrame. These 4 bits are designated auxiliary sample bits. If audio sample word is 24 bit, this aux bit is assinged as lowest 4 bist of audio sample word. |
| | 3:0 | sync preamble [3:0] | 4'b0000 if preamble code is B (or Z)<br>4'b1111 if preamble code is M( or X)<br>4'b1110 if preamble code is W(or Y) |
| 2 | 7:0 | Audio sample word [7:0] | Audio sample word of sub frame. Audio sample word is conveyed in time slot 8 to 27 of sub frame. The LSB of audio sample word in time slot 8 is conveyed as Audio sample word [0] of this field. |
| 3 | 7:0 | Audio sample word [15:8] | |
| 4 | 7 | parity bit | parity bit is conveyed in time slot 31 of sub frame. |
| | 6 | Channel status | channel status bit is conveyed in time slot 30 of sub frame. |
| | 5 | user data | user data is conveyed in time slot 29 of sub frame. |
| | 4 | validity flag | validity flag is conveyed in time slot 28 of sub frame. |
| | 3:0 | Audio sample word [19:16] | Audio sample word of sub frame. Audio sample word is conveyed in time slot 8 to 27 of sub frame. The MSB of audio sample word in time slot 27 is conveyed as Audio sample word [19] of this field. |

FIG.35

| HDMI Header | | | |
|---|---|---|---|
| Byte | bit | Name | Description |
| 1 | 7 | Signal Direction | 1: Signal direction is from Source to Sink. HDMI packet can transmit TMDS/FRL data. 0: Signal direction is from Sink to Source. HDMI packet can not transmit TMDS/FRL data. |
| | 6 | +5V_HPD | This signal transmit the +5V if the Signal direction is set to 1. This signal transmit the HPDif the Signal direction is set to 0. |
| | 5 | TMDS_FRL_packets | 1: the following packets transmit the TMDS_FRL_data packets 0: the following packets do NOT transmit the TMDS_FRL_data packets. This field must be set to 0, If Signal Directions is set to 0. |
| | 4 | CEC_Valid | 1: the following CEC packet is valid. 0: the following CEC packet is not valid. It means CEC signal level is kept previous one. |
| | 3 | DDC valid | 1: the following DDC packet is valid. 0: the following DDC packet is not valid. It means DDC signal level is kept previous one. |
| | 2 | HEC valid | 1:HEC packet is transmitted. 0:There is NO HEC packet. |
| | 1 | ARC valid | 1:ARC packet is transmitted. 0:There is NO ARC packet. This field must be set to 0, if Signal Direction is set to 1. |
| | 0 | reserved | reserved. (For HEC or ARC ) |

Header of App packet payload format for HDMI

FIG.38

DDC packet

| Byte | bit | Name | Description |
|---|---|---|---|
| 2 | 7:6 | reserved | |
| | 5 | DDC_I2C Error | 1: I2C bus hangup 0: no error |
| | 4 | DDC_I2C Data_Addr_indicator | 1: Data detected (payload byte follows) 0: not detected (no payload byte) |
| | 3 | DDC_I2C Nack | 1: Nack detected 0: not detected |
| | 2 | DDC_I2C ACK | 1: Ack detected 0: not detected |
| | 1 | DDC_I2C Stop | 1: Stop detected 0: not detected |
| | 0 | DDC_I2C Start/Restart | 1: Start/Restart detected 0: not detected |
| 3 | 7:0 | DDC_data | slave address, offset address, wdata or rdata |

DDC packet format of App packet payload format for HDMI

FIG.39

CEC packet

| Byte | bit | Name | Description |
|---|---|---|---|
| 4 | 7 | Num of CEC data | number of the sampled CEC data in a certain TDD period to transmit. 1:28 data 0:27 data |
| | 6:4 | reserved | |
| | 3 | CEC[0] | |
| | 2 | CEC[1] | |
| | 1 | CEC[2] | |
| | 0 | CEC[3] | |
| 4+n | 7 | CEC[8*(n-1)+4] | CEC sampled data of 1 TDD cycle. Sampling rate is 1 MHz. The total number of sampled CEC data in a certain TDD cycel is 27 or 28 samples. CEC[0] is the first data and CEC[26] or CEC[27] is the last data of this data block. |
| | 6 | CEC[8*(n-1)+5] | |
| | 5 | CEC[8*(n-1)+6] | |
| | 4 | CEC[8*(n-1)+7] | |
| | 3 | CEC[8*(n-1)+8] | |
| | 3 | CEC[8*(n-1)+9] | |
| | 1 | CEC[8*(n-1)+10] | |
| | 0 | CEC[8*(n-1)+11] | | n=1,2,3

CEC packet format of App packet payload format for HDMI

FIG.40

TMDS_FRL_control

| Byte | bit | Name | Description |
|---|---|---|---|
| | 7:4 | reserved | |
| 8 | 3:0 | TMDS_FRL_mode[3:0] | 0000: TMDS_1 ( TMDS clock rate = 1 x TMDS character)<br>0001: TMDS_2 ( TMDS clock rate = 0.25 x TMDS character)<br>0010:FRL3lane_3G<br>0011:FRL3lane_6G<br>0100:FRL4lane_6G<br>0101:FRL4lane_8G<br>0110:FRL4ane_10G<br>0111:FRL4ane_12G<br>else: reserved |
| 9 | 7:0 | TMDS_FRL_packet_size[15:8] | Number of TMDS_FRL data payload sise of this packet. Byte unit. |
| 10 | 7:0 | TMDS_FRL_packet_size[7:0] | |
| 11 | 7:6 | reserved | |
| | 5:0 | number of TMDS_FRL_character[13:8] | Number of TMDS_FRL characters are trasmitted in this packet. If HDMI is TMDS mode, a character is 10 bit. If HDMI is FRL mode, a charcter is 18 bit. |
| 12 | 7:0 | number of TMDS_FRL_character[7:0] | |

FIG.41

HEC control packet

| Byte | bit | Name | Description |
|---|---|---|---|
| 13(8) | 7 | reserved | |
| | 6:0 | packet_length[14:8] | Total length of payload in bytes |
| 14(9) | 7:0 | packet_length[7:0] | |

HEC_control

FIG.42

ARC control packet

| Byte | bit | Name | Description |
|---|---|---|---|
| 10 | 7 | reserved | |
| | 6 | valiable bit control enable | 1: enable to set the validity flag (V) of subframe if CEC32 calculation result shows error. |
| | 5:0 | number of SubFrame | the number of subframe conveyed in following packet. (maximum sampling rate of audio data is 192kbps due to the maximum number of this field.) |

ARC_control

FIG.43

TB_TMDS_FRL_control

| Byte | bit | Name | Description |
|---|---|---|---|
| 8 | 7:4 | reserved | |
| | 3:0 | TB_TMDS_FRL_mode[3:0] | 0000: TMDS_1 ( TMDS clock rate = 1 x TMDS character)<br>0001: TMDS_2 ( TMDS clock rate = 0.25 x TMDS character)<br>0010:FRL3lane_3G<br>0011:FRL3lane_6G<br>0100:FRL4lane_6G<br>0101:FRL4lane_8G<br>0110:FRL4lane_10G<br>0111:FRL4lane_12G<br>1000:Tri-Byte mode<br>else: reserved |
| 9 | 7:0 | TB_TMDS_FRL_packet_size[15:8] | Number of TB_TMDS_FRL data payload sise of this packet. Byte unit. |
| 10 | 7:0 | TB_TMDS_FRL_packet_size[7:0] | |
| 11 | 7:6 | reserved | |
| | 5:0 | number of TB_TMDS_FRL_character[13:8] | Number of TB_TMDS_FRL characters are trasmitted in this packet. If HDMI is TMDS mode, a character is 10 bit. If HDMI is FRL mode, a character is 18 bit. If HDMI is Tri-byte mode, a character is 24bit (3byte) |
| 12 | 7:0 | number of TB_TMDS_FRL_character[7:0] | |

TB_TMDS_FRL_control

FIG.47

COMMUNICATION APPARATUS AND COMMUNICATION SYSTEM

CROSS REFERENCE TO RELATED APPLICATIONS

This application claims the benefits of U.S. Provisional Application No. 63/306,633 filed Feb. 4, 2022 and U.S. Provisional Application No. 63/389,108 filed Jul. 14, 2022, the entire contents of which are incorporated herein by reference.

BACKGROUND

The present disclosure relates to a communication apparatus and a communication system.

A technology for performing high-speed serial communication via a transmission cable connected between a plurality of devices has been proposed (Japanese Patent Application Laid-open No. 2011-239011). This type of high-speed serial communication is used in various fields and is used in, for example, communication between in-vehicle devices.

SUMMARY

Meanwhile, mainly in consumer devices, a high-definition multimedia interface (HDMI) is widely used as a high-speed interface standard for transmitting a large-capacity video signal and a large-capacity audio signal.

A TV, a Blu-ray player, or the like is mounted on or brought into a vehicle in some cases. Making it possible to transmit/receive an HDMI signal in the above-mentioned in-vehicle high-speed serial communication improves the convenience.

However, since the transmission distance of the HDMI signal is approximately several m, there is a problem that the space for a video device and an in-vehicle monitor is limited. In this regard, in the present disclosure, there are provided a communication apparatus and a communication system in which an HDMI signal can be transmitted/received over a longer distance in a high-speed serial communication system different from the HDMI.

In order to achieve the above-mentioned object, in accordance with the present disclosure, there is provided a communication apparatus including:
  an encoder that generates a packet of a time division duplex (TDD) communication system, the packet including a high-definition multimedia interface (HDMI) signal; and
  a communication unit that transmits the packet to a communication partner device for each of a plurality of divided periods obtained by dividing one TDD burst period in the TDD communication system.

The communication unit may transmit the packet to the communication partner device every one of 6.844 [μsec], which is a time period obtained by dividing the one TDD burst period into four, and 3.422 [μsec], which is a time period obtained by dividing the one TDD burst period into eight.

The encoder may generate the packet that includes one of transition minimized differential signaling (TMDS) characters in units of 10 bits of a TMDS signal and fixed rate link (FRL) characters in units of 18 bits of an FRL signal (1) every divided time period of 6.844 [μsec], which is a time period obtained by dividing the one TDD burst period of an Automotive SerDes Alliance (ASA) standard into four, where a transmission capability of one of the TMDS signal and the FRL signal included in the HDMI signal is 24 [Gbps] or less, and (2) every divided time period of 3.422 [μsec], which is a time period obtained by dividing the one TDD burst period in the ASA standard into eight, where the transmission capability exceeds 24 [Gbps].

The packet may include information regarding one of the number of the TMDS characters and the number of the FRL characters.

The communication unit may transmit, where the HDMI signal includes a display data channel (DDC) signal, the packet that includes the DDC signal to the communication partner device in at least one of the plurality of divided periods in the one TDD burst period.

A communication speed of the DDC signal included in the HDMI signal may be 400 kbps or more.

The communication unit may transmit, where the HDMI signal includes a consumer electronics control (CEC) signal, the packet that includes the CEC signal sampled in synchronization with a clock signal shared with the communication partner device to the communication partner device in at least one of the plurality of divided periods in the one TDD burst period.

The communication apparatus may further include a decoder that decodes a packet including a response signal of the CEC signal transmitted from the communication partner device and returns, within 0.35 msec after an HDMI device that has transmitted the CEC signal transmits the CEC signal, the response signal to the HDMI device.

The communication unit may transmit, where the HDMI signal includes a +5V signal, the packet that includes the +5V signal to the communication partner device in at least one of the plurality of divided periods in the one TDD burst period.

The communication unit may transmit, where the HDMI signal includes an HDMI Ethernet Channel (HEC) signal, the packet that includes the HEC signal to the communication partner device in at least one of the plurality of divided periods in the one TDD burst period.

The communication unit may transmit, where the HDMI signal includes a Try-byte signal, the packet that includes TMDS characters in units of 24 bits of the Try-byte signal to the communication partner device for each of the divided periods obtained by dividing the one TDD burst period into four.

The communication unit may transmit, where the HDMI signal includes the Try-byte signal, information regarding the number of TMDS characters to be transmitted in a unit time to the communication partner device for each of the divided periods obtained by dividing the one TDD burst period into four.

The encoder may generate the packet in which a control signal group that includes an HPD signal, a DDC signal, and a CEC signal is disposed ahead of a data signal group that includes one of a TMDS signal and an FRL signal and an HEC signal.

The encoder may generate the packet in which an error detection code has been individually added to the control signal group, the TMDS signal or the FRL signal, and the HEC signal.

In accordance with the present disclosure, there is provided a communication apparatus including:
  a decoder that decodes an HDMI signal included in a first packet received from a communication partner device by a TDD communication system;

an encoder that generates a second packet including a response signal to the communication partner device on the basis of the HDMI signal from the communication partner device; and a communication unit that transmits the second packet to the communication partner device for each TDD burst period in the TDD communication system.

The decoder may decode the HDMI signal included in the first packet received from the communication partner device by the TDD communication system, and reproduce a frequency of one of a TMDS clock and an FML clock on the basis of information regarding one of the number of TMDS characters and the number of FRL characters per unit time included in the decoded HDMI signal.

The decoder may reproduce a TMDS character period where the decoded HDMI signal includes information regarding the number of TMDS characters per unit time.

The communication unit may transmit, where the HDMI signal decoded by the decoder includes a CEC signal, the second packet that includes a response signal to the CEC signal to the communication partner device such that an HDMI device connected to the communication partner device receives the response signal to the CEC signal within 0.35 [msec] after the HDMI device transmits the HDMI signal that includes the CEC signal to the communication partner device.

The communication apparatus may further include a power source unit that supplies a +5V power signal to a reproducing device of the HDMI signal where the HDMI signal decoded by the decoder includes a +5V signal, and the encoder may generate the second packet that includes a hot plug detect (HPD) signal where the HDMI signal decoded by the decoder includes the +5V power signal.

The encoder may generate, where the HDMI signal that includes an audio return channel (ARC) signal is transmitted to the communication partner device, the second packet that includes a sub-frame of four bytes including time slots 0 to 31, converts a preamble for transmitting the time slots 0 to 3 into a specific code of four bits, and inputs, to the time slot 4, a timestamp at which the ARC signal was input.

In accordance with the present disclosure, there is provided a communication system including:

a first communication apparatus; and a second communication apparatus that alternately transmits/receives information to/from the first communication apparatus within a period assigned by a time division duplex (TDD) communication system, the first communication apparatus including an encoder that generates a first packet of the TDD communication system, the first packet including a high-definition multimedia interface (HDMI) signal, and a communication unit that transmits the first packet to the second communication apparatus for each of a plurality of divided periods obtained by dividing one TDD burst period in the TDD communication system, the second communication apparatus including a decoder that decodes an HDMI signal included in the first packet received from the first communication apparatus by the TDD communication system, an encoder that generates a second packet including a response signal to the first communication apparatus on the basis of the HDMI signal from the first communication apparatus, and a communication unit that transmits the second packet to the first communication apparatus for each TDD burst period of an Up link in the TDD communication system.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 4 is a diagram showing a data rate of an FRL signal and the number of transmission lanes to be used;

FIG. 9 is a diagram showing the transmission capability in the ASA standard;

FIG. 10 is a diagram showing the number of PHY data blocks per TDD cycle to be transmitted by each of transmission capabilities SG3 to SG5;

FIG. 14 is a diagram showing an HDMI signal that can be transmitted in one TDD burst period in the ASA standard;

FIG. 16 is a diagram showing a relationship between the transmission speed of the HDMI transmitted in accordance with the timing shown in FIG. 15 and the number of transmission lanes and transmission capability of a SerDes system 20;

FIG. 17 is a diagram showing the total number of PHY data blocks included in one TDD burst period of a Down link in the ASA standard;

FIG. 19 is a diagram showing an example of adding a dummy bit to perform packing;

FIG. 22 is a diagram showing an example of adding a dummy bit to perform packing;

FIG. 24 is a diagram showing an example of adding a dummy bit to perform packing;

FIG. 27 is a diagram showing a configuration of a DDC packet;

FIG. 30 is a diagram showing a configuration of a CEC packet;

FIG. 33 is a diagram describing the format of an IEC60598 packet;

FIG. 35 is a diagram showing a configuration of an ARC data packet;

FIG. 38 is a diagram showing a configuration of a Header the Down link packet and the Up link packet;

FIG. 39 is a diagram showing a configuration of a DDC packet;

FIG. 40 is a diagram showing a configuration of a CEC packet;

FIG. 41 is a diagram showing a configuration of TMDS_FRL_control;

FIG. 42 is a diagram showing a configuration of an HEC_control packet;

FIG. 43 is a diagram showing a configuration of an ARC_control packet;

FIG. 47 is a diagram showing a configuration of TMDS_FRL_control at the time of transmission of a Try-byte signal.

DETAILED DESCRIPTION OF EMBODIMENTS

Hereinafter, an embodiment of a communication apparatus and a communication system will be described with reference to the drawings. Although the main components of the communication apparatus and the communication system will be mainly described, components or functions that are not illustrated or described may be present in the communication apparatus and the communication system. The following description does not exclude components or functions that are not illustrated or described.

The HDMI is a high-speed interface standard for transmitting a large-capacity video/audio signal, a bidirectional device-to-device control signal, and the like, and is widely used mainly in consumer devices. Several standards have been established in the HDMI. The standards widely used at present are HDMI 1.4b, and HDMI 2.0 and HDMI 2.1 that are successors thereof.

Figure 1:
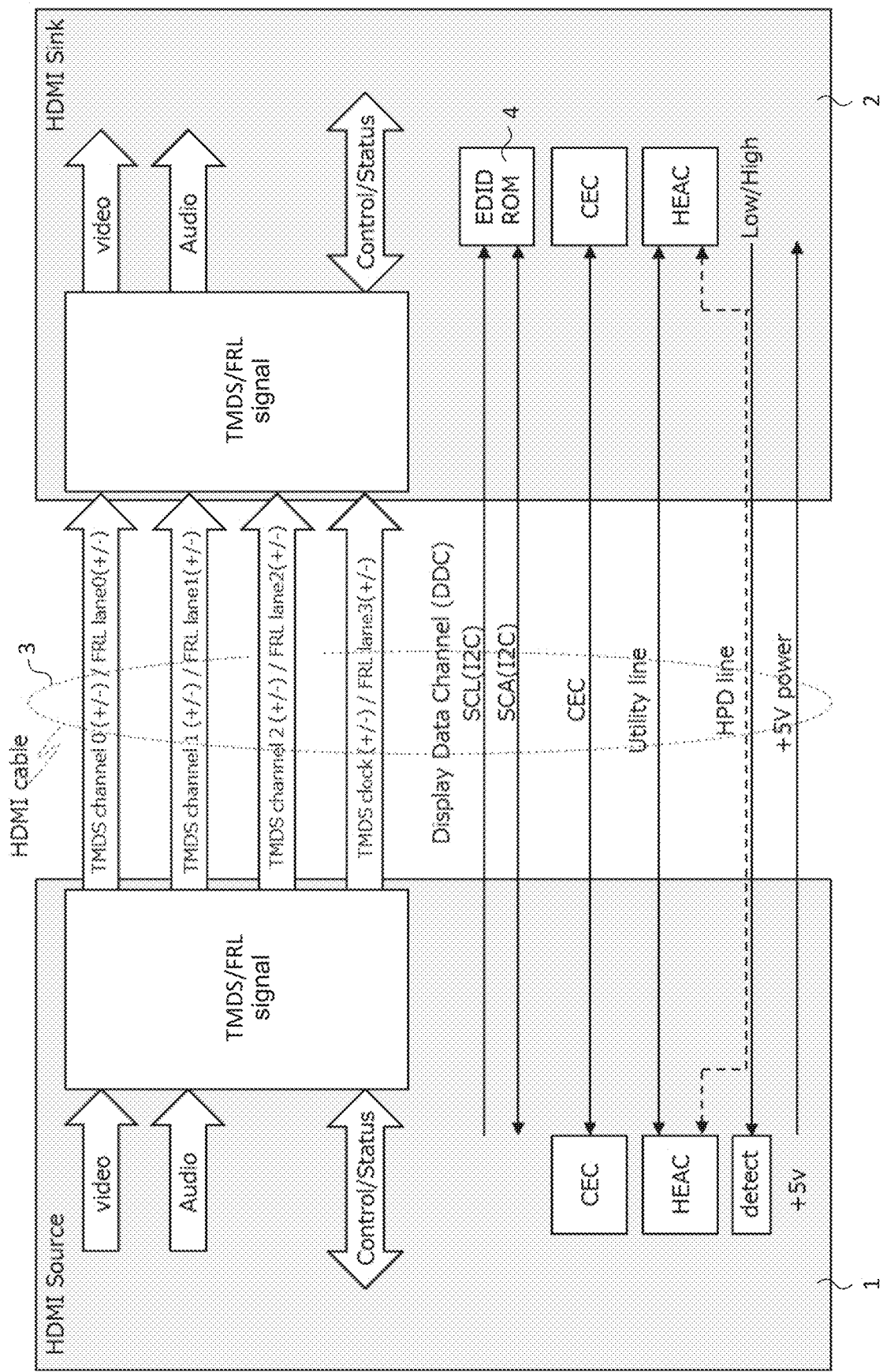
FIG. 1 is a diagram showing signals to be transmitted/received by a standard HDMI.

FIG. 1 is a diagram showing signals to be transmitted/received by a standard HDMI. In FIG. 1, an HDMI source device 1 that is a source of a video/audio signal and an HDMI Sink device 2 that reproduces a video/audio signal are connected to each other via an HDMI cable. The distance between devices that are capable of transmitting a signal to be transmitted/received in the HDMI (hereinafter, an HDMI signal) is normally approximately 5 m although it depends on the signal speed.

The HDMI includes a transition minimized differential signaling (TMDS) signal or fixed rate link (FRL) signal, a display data channel (DDC) signal, a consumer electronics control (CEC) signal, a +5V power signal, a hot plug detect (HPD) signal, and a Utility signal.

The TMDS signal or FRL signal transmits high-speed and large-capacity video/audio. The DDC signal is used for reading extended display identification data (EDID) read only memory (ROM) 4 and transmitting/receiving high-bandwidth digital content protection system (HDCP) authentication data.

The CEC signal transmits a protocol for performing an operation of linking HDMI devices. The +5V power signal supplies a power supply voltage from the HDMI source device 1 to the EDID ROM 4 of the HDMI Sink device 2 and enables the reading of the EDID ROM 4 while the HDMI Sink device 2 is inactive.

The hot plug detect (HPD) signal indicates that HDMI devices are connected to each other via an HDMI cable by returning, by the HDMI Sink device 2, the +5V power signal supplied from the HDMI source device 1 to the HDMI source device 1.

The Utility signal is used together with an HPD signal in order to transmit an HDMI Ethernet Channel (HEC) and an audio return channel (ARC). For example, a PHY_Tx in a SerDes (node 2) described below transmits, in the case where an HDMI signal includes an HEC signal, a packet that includes an HEC signal to the SerDes (node 1) in one of four or eight divided periods in one TDD burst period.

Figure 2A:
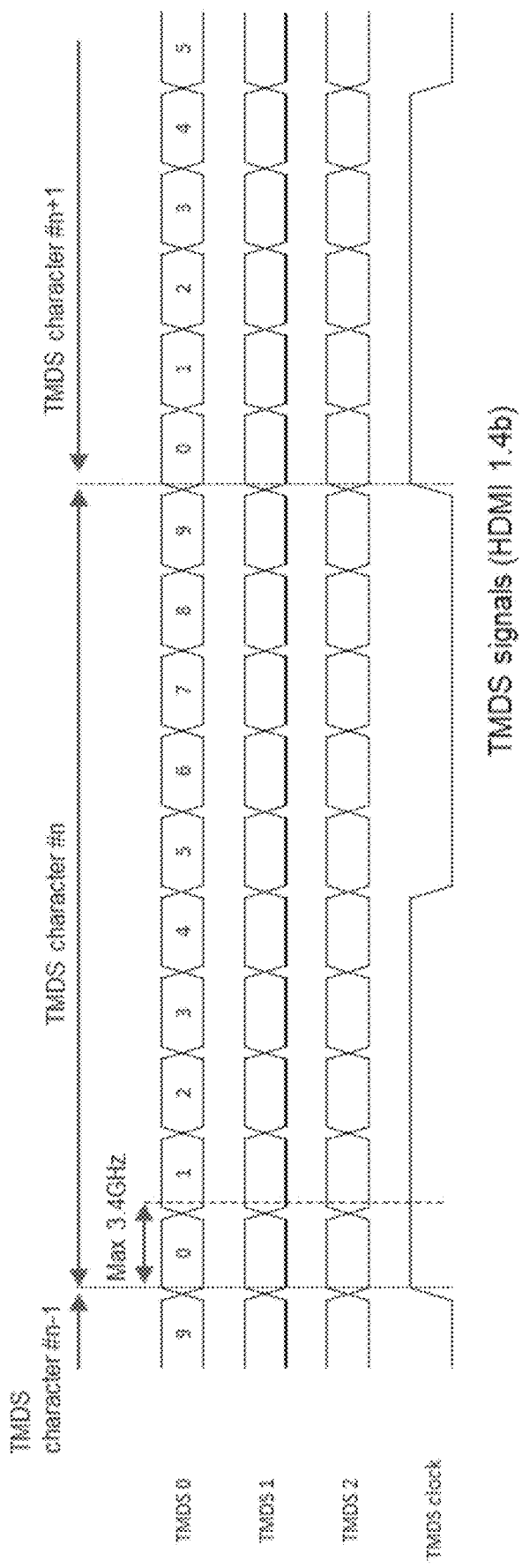
FIG. 2A is a timing chart of a TMDS signal used in the HDMI 1.4b.
Figure 2B:
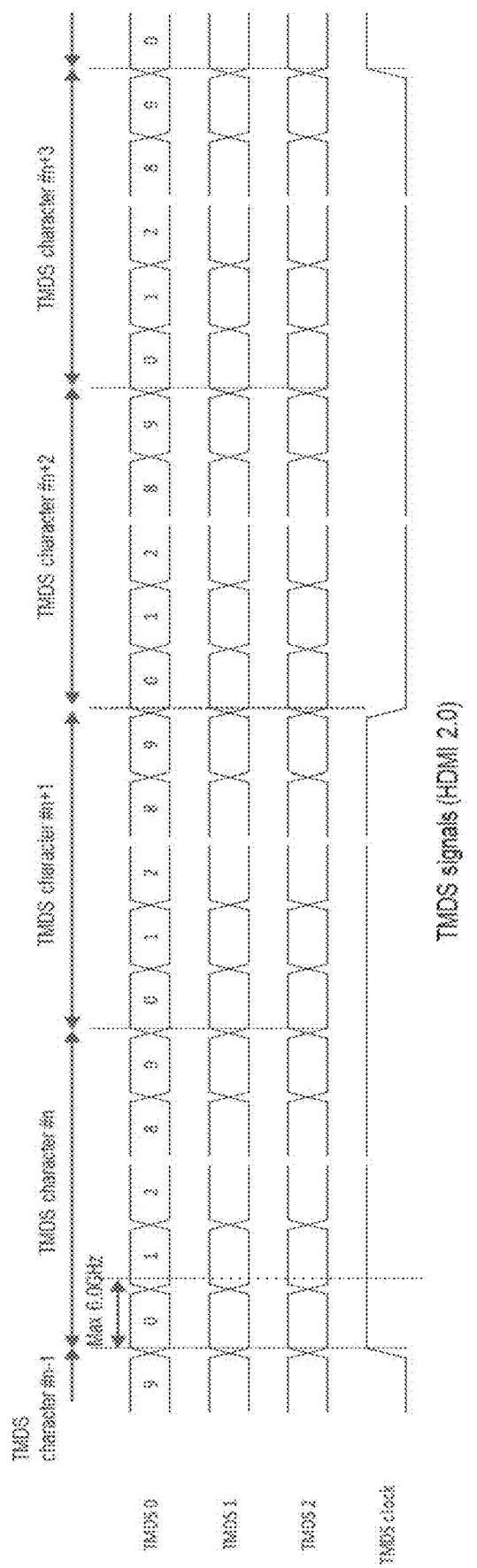
FIG. 2B is a timing chart of a TMDS signal used in the HDMI 2.0.

FIG. 2A is a timing chart of a TMDS signal used in the HDMI 1.4b and FIG. 2B is a timing chart of a TMDS signal used in the HDMI 2.0. The TMDS signal includes three TMDS data signals for transmitting high-speed and large-capacity data and a TMDS clock signal synchronized with the TMDS data. The three TMDS signals each include data in units of 10 bits called TMDS character on which TMDS coding, which is one type of 8b10b coding (coding from 8 bits to 10 bits), has been performed. In the HDMI 1.4b, the maximum rate of one pieces of TMDS data is 3.4 GHz.

In the HDMI 2.0, the maximum rate of one piece of TMDS data is 6 GHz. Therefore, the maximum data rate of TMDS is 10.2 Gbps in the HDMI 1.4b and 18.0 Gbps in the HDMI 2.0.

In the HDMI standards up to the HDMI 1.4b, one TMDS character is the TMDS clock cycle. In the HDMI 2.0, in the case where TMDS data faster than that in the HDMI 1.4b is transmitted, four TMDS characters are the TMDS clock cycle.

The TMDS clock has a synchronous relationship with the pixel clock of a video signal transmitted by the TMDS data, and the HDMI Sink device 2 is capable of reproducing the pixel clock from the received TMDS clock.

Figure 3:
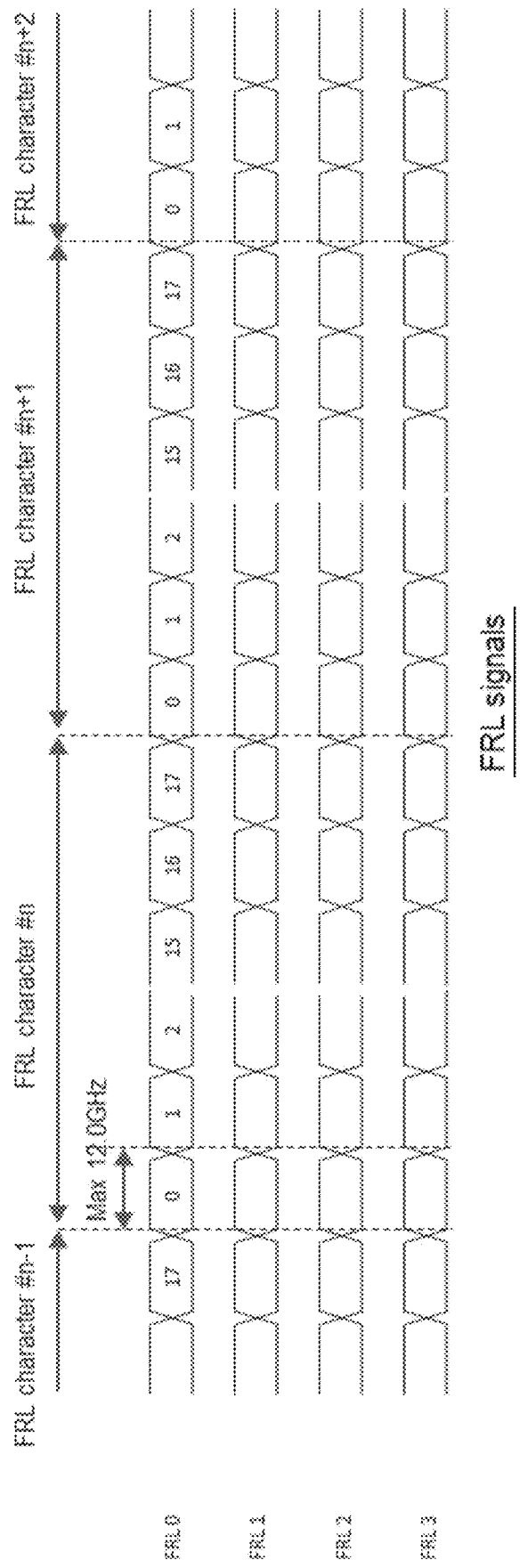
FIG. 3 is a timing chart of an FRL signal used in the HDMI 2.1.

FIG. 3 is a timing chart of an FRL signal used in the HDMI 2.1. The FRL signal is a signal of a fixed rate independent of the pixel clock of a video signal to be transmitted, unlike the TMDS signal. The respective pieces of FRL data constituting an FRL signal are transmitted in units of data called FRL character of 18-bit units on which 16b18b coding (coding from 16 bits to 18 bits) has been performed. The FRL signal is transmitted using three or four transmission lanes. As shown in FIG. 3, there is no transmission clock in the FRL signal.

FIG. 4 is a diagram showing the data rate of the FRL signal and the number of transmission lanes to be used. In the HDMI standard, the HDMI 2.1 needs to include the HDMI 2.0 and the HDMI 1.4b due to the need for upward compatibility. That is, in the HDMI 2.1, a TMDS mode in which a TMDS clock is transmitted in synchronization with a pixel clock and an FRL mode need to be switchable.

Figure 5:
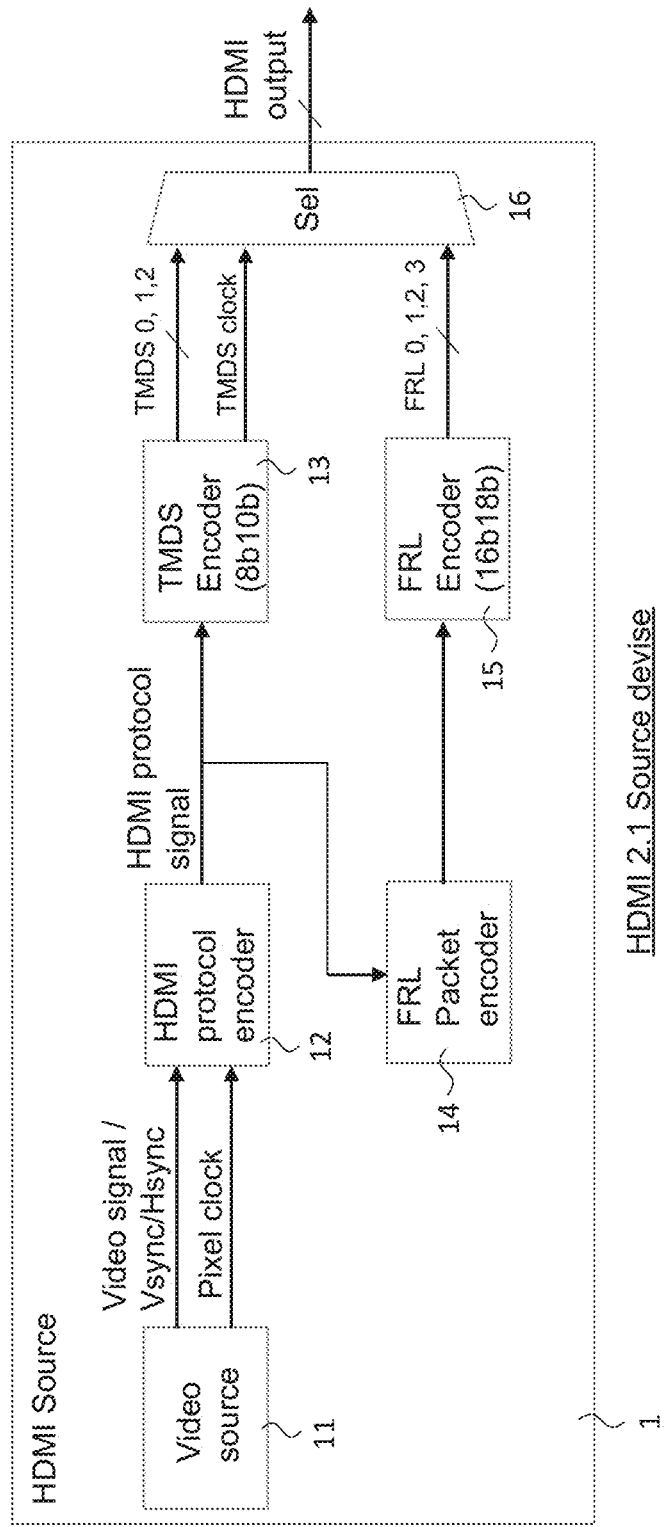
FIG. 5 is a block diagram showing an example of an internal configuration of an HDMI source device.

FIG. 5 is a block diagram showing an example of an internal configuration of the HDMI source device 1. The HDMI source device 1 in FIG. 5 includes a video source 11, an HDMI protocol encoder 12, a TMDS encoder 13, an FRL packet encoder 14, an FRL encoder 15, and a selector (Sel) 16.

The Video source 11 outputs a video signal, a synchronization signal Vsynce/Hsync, and a pixel clock. The HDMI protocol encoder 12 outputs an HDMI protocol signal. The TMDS encoder 13 outputs a TMDS signal that includes TMDS data and a TMDS clock. The FRL encoder 15 outputs an FRL signal that includes FRL data and an FRL clock. The selector 16 selects one of the TMDS signal and the FRL signal and outputs the selected signal.

The DDC signal is a signal of the inter-integrated circuit (I2C) standard generally used in a device-to-device control signal. Therefore, the DDC signal includes two lines of SCL of a clock line and SDA of a data line. As the data rate of I2C, 100 kbps (Standard mode), 400 kbps (Fast mode), 1 Mbps (Fast mode plus), and the like are defined in the I2C standard. In the HDMI standard, the data rate of the DDC signal is desired to satisfy 100 kbps (Standard mode), and it is shown that 400 kbps (Fast mode) may also be used.

The CEC signal is a consumer electronics control (CEC) signal for transmitting a protocol for performing an operation of linking HDMI devices. The CEC signal is a bus that includes only a data line.

Figure 6:
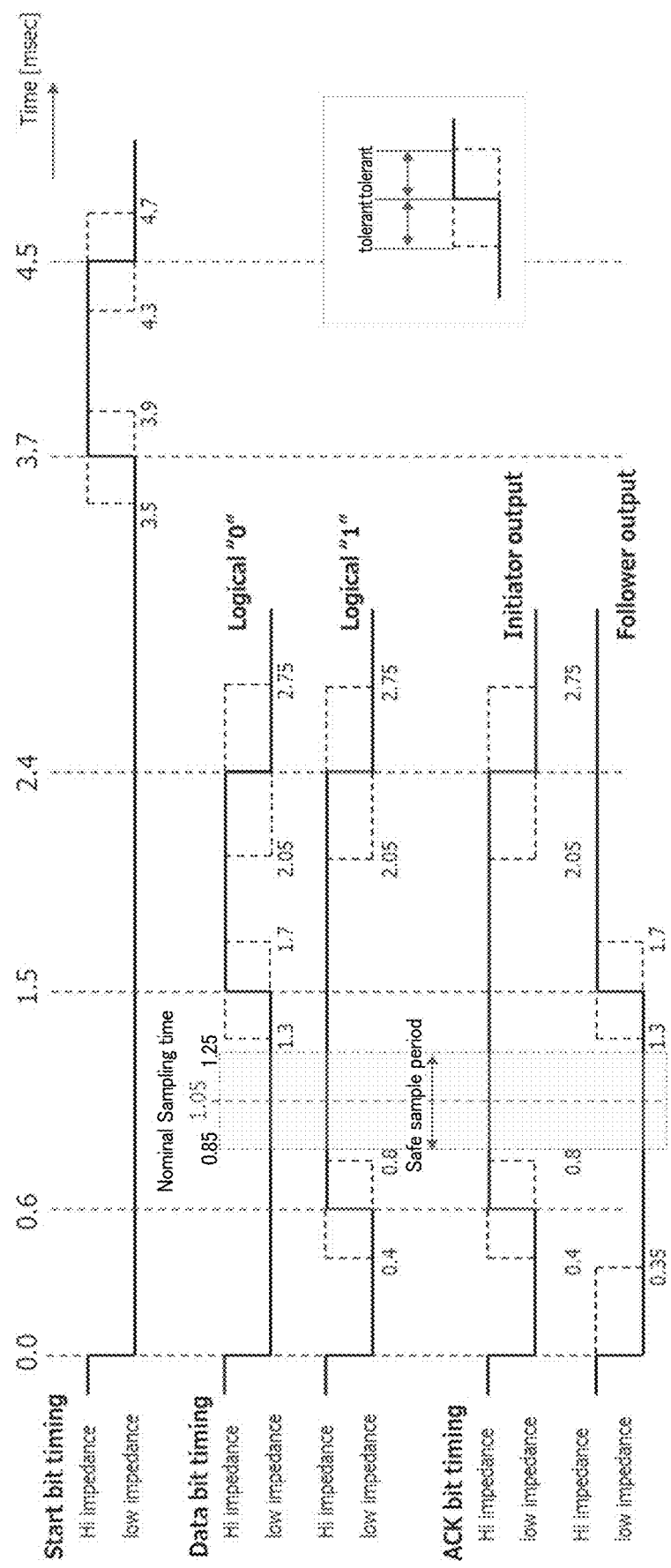
FIG. 6 is a timing chart of a CEC signal.

FIG. 6 is a timing chart of a CEC signal. The CEC signal is a 1-bit signal having no clock line. For this reason, the CEC signal defines the signal change timing in units of msec starting from the time when each signal fell from the H state to the L state. Further, the signal acquisition timing on the reception side of the CEC signal defines the time point of 1.05 msec starting from the time when each signal fell from the H state to the L state. Further, the signal reception response is performed using an Ack bit, but an Ack bit from a Follower that has transmitted a CEC signal including an Ack bit needs to be received within 0.35 msec after an initiator that has received the original CEC signal outputs an Ack bit (Ack bit timing in FIG. 4).

The +5V power signal is a signal for supplying a power supply voltage from the HDMI source device 1 to the EDID ROM 4 of the HDMI Sink device 2 and enabling the reading of the EDID ROM 4 while the HDMI Sink device 2 is inactive, as described above.

The hot plug detect (HPD) signal makes a notification that the HDMI devices 1 and 2 are connected to each other via an HDMI cable by returning, by the HDMI Sink device 2, the +5V power signal supplied from the HDMI source device 1 to the HDMI source device 1. The HDMI source device 1 detects, when the HPD transitions from low to High, that an HDMI cable is connected, reads the content of the EDID ROM 4 of the HDMI Sink device 2 using a DDC signal, detects a video format that can be received by the HDMI Sink device 2, and thus transmit an optimal video signal.

The Utility signal line is used together with an HDP signal line. The Utility signal line and the HDP signal line are capable of simultaneously transmitting a signal corresponding to Ethernet 100Base-TX for bidirectional communication and an IEC 60958 signal of a digital audio signal format from a sink to a source. The function of transmitting these two signal formats is called HDMI Ethernet and Audio Return Channel (HEAC) in the HDMI.

Figure 7:
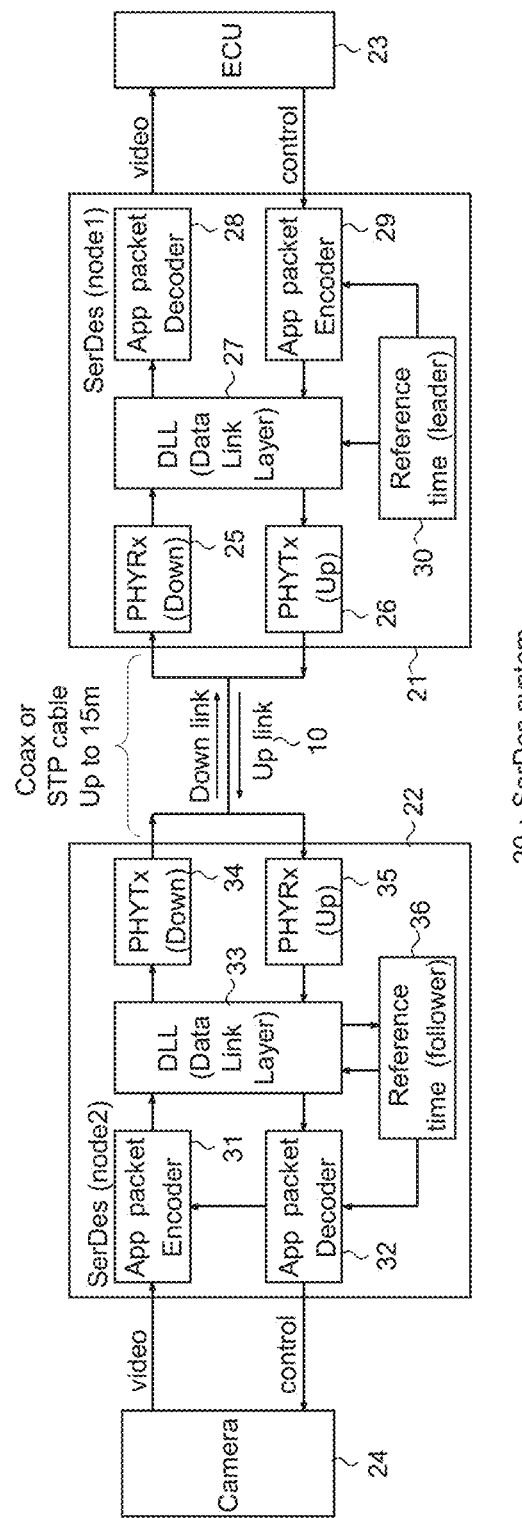
FIG. 7 is a block diagram of a SerDes system that performs high-speed serial transmission using a SerDes.

In addition to the HDMI, a high-speed serial transmission system using a SerDes is known. FIG. 7 is a block diagram of a SerDes system 20 that performs high-speed serial transmission using a serializer/deserializer (SerDes) such as an FPD link.

The SerDes system 20 in FIG. 7 includes a SerDes (node 1) 21 and a SerDes (node 2) 22. The SerDes (node 1) 21 is connected to, for example, an ECU 23 and the SerDes (node 2) 22 is connected to, for example, a camera module (Camera) 24. The SerDes (node 1) 21 and the SerDes (node 2) 22 perform, for example, high-speed serial transmission by a time division duplex (TDD) communication system.

The SerDes (node 1) 21 includes a PHY_Rx 25, a PHY_Tx 26, a data link layer (DLL) 27, an App packet decoder 28, an App packet encoder 29, and a Reference time generator (leader) 30.

The PHY_Rx 25 in the SerDes (node 1) 21 receives a Down link packet transmitted from the SerDes (node 2) 22 via a cable 10. The PHY_Tx 26 transmits an Up link packet to the SerDes (node 2) 22 via the cable 10. The DLL 27 extracts an application packet from the Down link packet and receives, from the App packet encoder 29, an application packet to be transmitted to the SerDes (node 2) 22 to generate a DLL container. The App packet decoder 28 transmits, to the ECU 23, a video signal obtained by decoding the application packet from the DLL 27. The App packet encoder 29 generates an application packet that includes a control signal transmitted from the ECU 23 and transmits the generated application packet to the DLL 27.

The SerDes (node 2) 22 includes an App packet encoder 31, an App packet decoder 32, a DLL 33, a PHY_Tx 34, a PHY_Rx 35, and a Reference time generator (follower) 36.

The App packet encoder 31 in the SerDes (node 2) 22 receives a video signal from the camera module 24 to generate an application packet that includes the video signal. The App packet decoder 32 transmits, to the camera module 24, a control signal obtained by decoding the application packet from the DLL 33. The DLL 33 generates a DLL container that includes the application packet generated by the App packet encoder 31 and transmits the generated DLL container to the PHY_Tx 34. Further, the DLL 33 extracts an application packet from the Up link packet received by the PHY_Rx 35 and transmits the extracted application packet to the App packet decoder 32.

The SerDes system 20 as shown in FIG. 7 is used in, for example, an in-vehicle network and is particularly used to transmit, to the ECU 23, a high-speed and large-capacity video signal from the camera module 24 mounted on a vehicle. A coaxial cable (Coax), a shielded twisted pair wire (STP), or the like cheaper than an HDMI cable is used as the transmission cable 10.

In recent years, transmission standardization work has been carried out by the Automotive SerDes Alliance (ASA) that is an in-vehicle SerDes transmission standardization organization.

Figure 8:
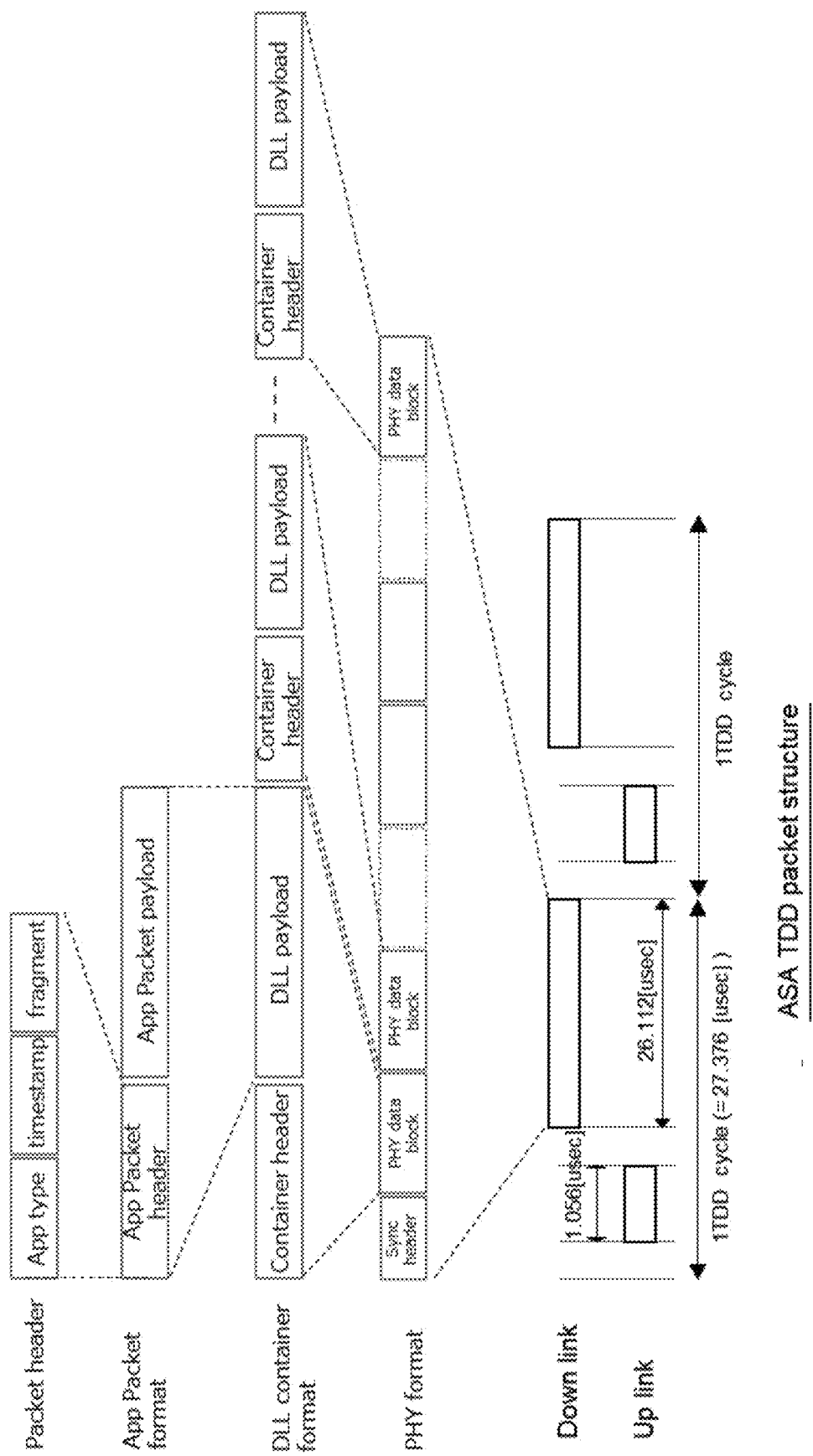
FIG. 8 is a diagram showing a packet format to be transmitted/received in the case where the SerDes system shown in FIG. 7 performs high-speed serial transmission conforming to the ASA standard.

FIG. 8 is a diagram showing a packet format to be transmitted/received in the case where the SerDes system 20 shown in FIG. 7 performs high-speed serial transmission conforming to the ASA standard. A Down link packet transmitted in one TDD burst period includes a plurality of DLL containers in a PHY format. Each DLL container includes a sync header and a PHY data block. The PHY data block includes a container header and a DLL payload. The DLL payload includes various application packets. Each application packet includes an application packet header and an application packet payload. The application packet header includes an application type representing the type of an application, a timestamp, and a fragment. The timestamp represents the time of specific timing of an application measured by a clock shared in the SerDes system 20. The fragment indicates to divide, in the case where the size of an application is large and the application cannot be transmitted in one application packet, the application into a plurality of application packets for transmission.

The ASA standard adopts asymmetric bidirectional transmission with time division duplex (TDD) of a Down link for flowing high-speed and large-capacity data such as a video signal as shown in FIG. 7 and an Up link for flowing low-speed and small-capacity data such as a control signal. As shown in FIG. 8, in the ASA, assumption is made that the Down link transmission period is longer than the Up link transmission period and the transmission capability of the Down link packet is much larger than the transmission capability of the Up link packet.

FIG. 9 is a diagram showing transmission capabilities of the DLL payload in the ASA standard. In the ASA standard, five transmission capabilities of SG1 to SG5 are defined. As shown in FIG. 8, a Down link packet includes a plurality of PHY data blocks. The number of PHY data blocks included in the Down link packet differs between the transmission capabilities SG3 to SG5 as shown in FIG. 9.

FIG. 10 is a diagram showing the number of PHY data blocks per TDD cycle to be transmitted by each of the transmission capabilities SG3 to SG5. In the ASA, it has been studied to expand the transmission capability up to 52 [Gbps] by increasing the number of transmission lanes to two or four. This aims to make it possible to transmit 4 k or 8 k video signals for replacing a meter, a console, and the like with high-definition LCD panels or installing high-definition LCD monitors for passengers in recent vehicles.

Figure 11:
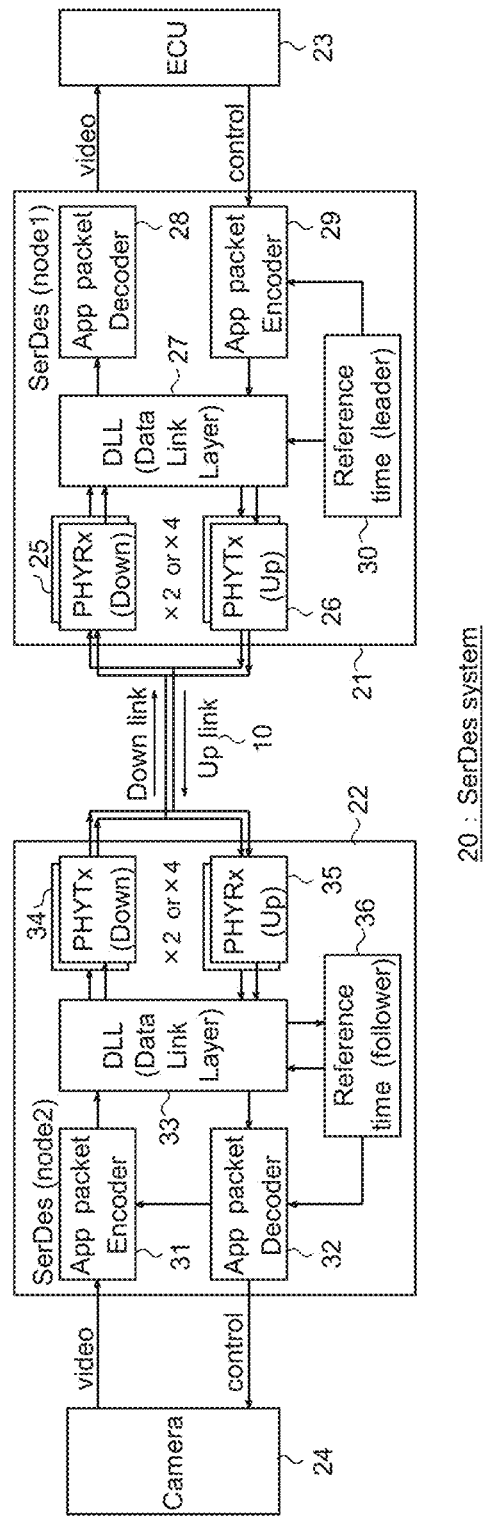
FIG. 11 is a block diagram of a SerDes system in which the number of transmission lanes was increased to two or four.

FIG. 11 is a block diagram of the SerDes system 20 in which the number of transmission lanes was increased to two or four. A plurality of PHY_Txs 26 (or 34) and a plurality of PHY_Rxs 25 (or 35) are respectively provided in the SerDes (node 1) 21 and the SerDes (node 2) 22 in accordance with the number of transmission lanes.

In the SerDes system 20 conforming to the ASA standard, a large-capacity video signal can be transmitted in a Down link packet from the camera module 24 to the ECU 23. The standard of the HDMI is more versatile than the ASA standard, and making it possible to transmit an HDMI signal in the SerDes system 20 conforming to the ASA standard is convenient in the following respects.

1. Since the HDMI protocol is already widespread, a source device and a sink device conforming to the HDMI standard are easily available and acquisition costs can be reduced.

2. The control driver software and the like for the source device and the sink device can be used as they are.

3. Although the transmission distance of the HDMI is typically approximately 5 m, transmitting an HDMI signal using a TDD communication system makes it possible to extend the transmission distance of an HDMI signal to 15$m$.

4. A Coax cable and an STP cable cheaper than an HDMI cable can be used.

Figure 12:
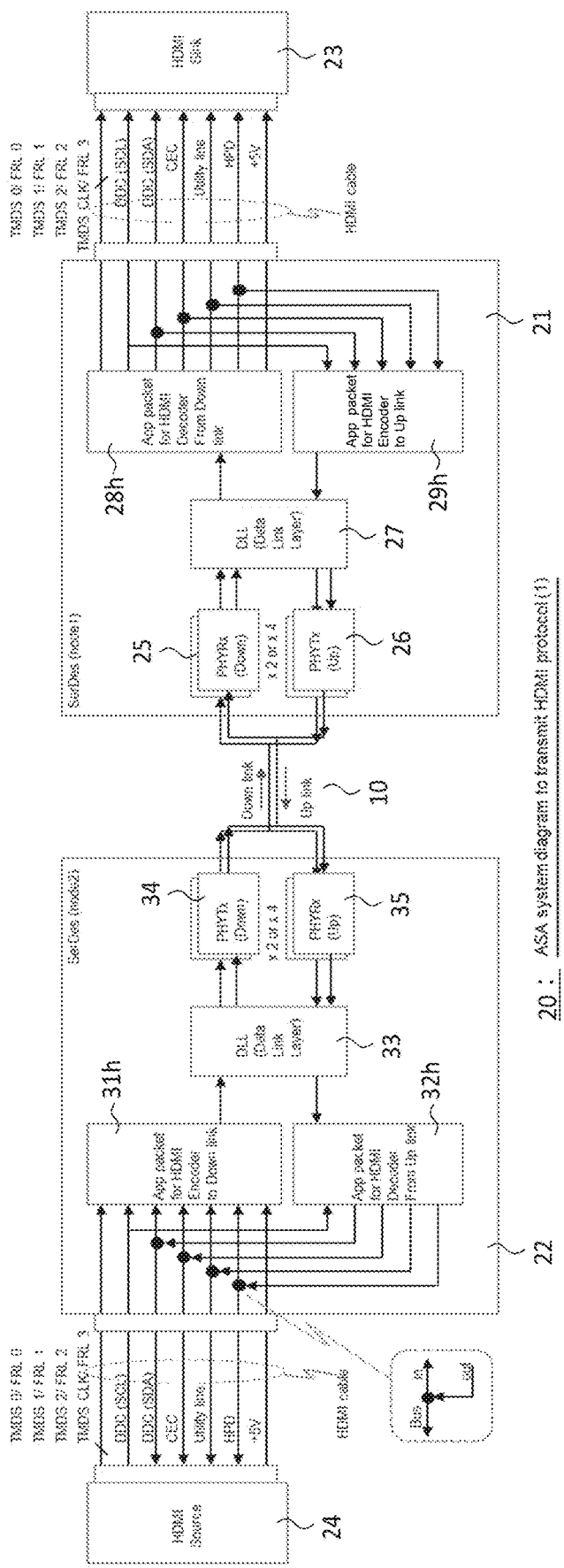
FIG. 12 is a block diagram of a SerDes system capable of transmitting an HDMI signal using a TDD communication system conforming to the ASA standard.

FIG. 12 is a block diagram of the SerDes system 20 capable of transmitting an HDMI signal using a TDD communication system conforming to the ASA standard. The SerDes system 20 in FIG. 12 includes the SerDes (node 1) 21 connected to the HDMI Sink device 23 and the SerDes (node 2) 22 connected to an HDMI source device 24. The SerDes (node 1) 21 and the SerDes (node 2) 22 transmit an HDMI signal in a packet conforming to the ASA standard. The HDMI signal is transmitted via a cable for high-speed serial transmission between the SerDes (node 1) 21 and the SerDes (node 2) 22.

An App packet for HDMI encoder 29$h$ and an App packet for HDMI decoder 28$h$ in the SerDes (node 1) 21 shown in FIG. 12 are connected the HDMI Sink device 23 via a common HDMI cable. Similarly, an App packet for HDMI encoder 31$h$ and an App packet for HDMI decoder 32$h$ in the SerDes (node 2) 22 are connected to the HDMI source device 24 via a common cable.

Figure 13:
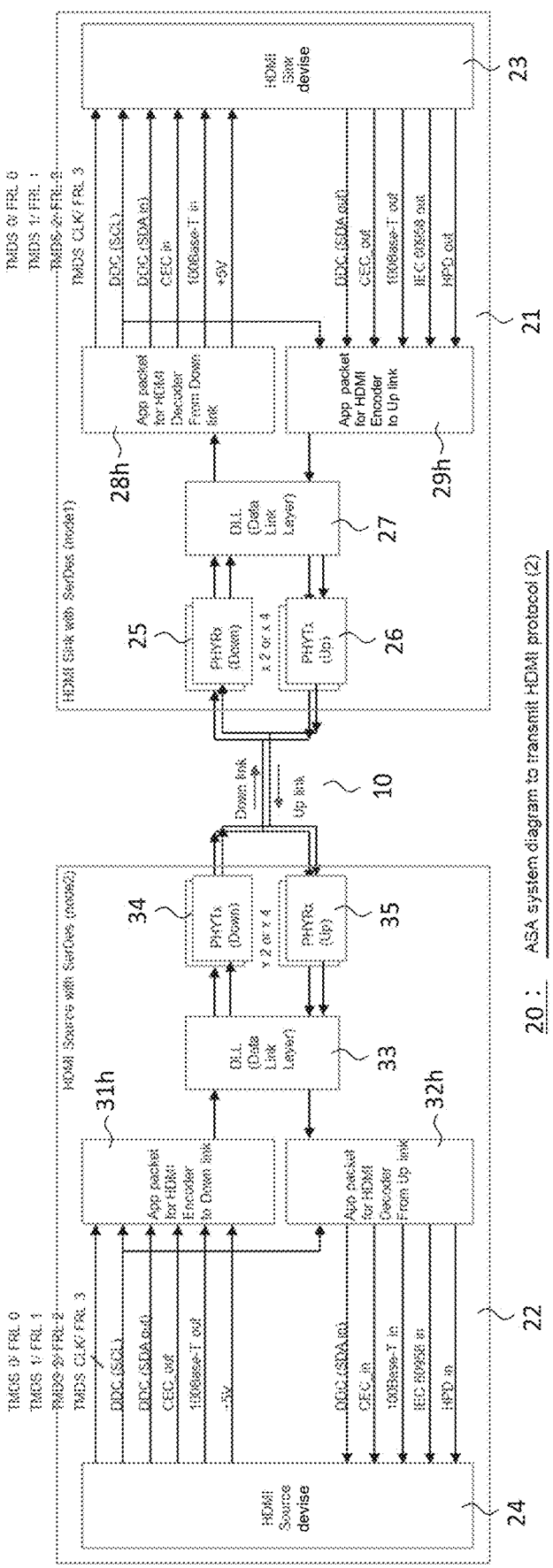
FIG. 13 is a block diagram of a SerDes system according to a modified example of FIG. 12.

FIG. 13 is a block diagram of a SerDes system according to a modified example of FIG. 12. In FIG. 13, an HDMI cable for connecting the App packet for HDMI decoder and the HDMI Sink device 23 in the SerDes (node 1) 21 to each other is provided separately from an HDMI cable for connecting the App packet for HDMI encoder and the HDMI Sink device 23 in the SerDes (node 1) 21 to each other. Similarly, an HDMI cable for connecting the App packet for HDMI decoder and the HDMI source device 24 in the SerDes (node 2) 22 to each other is provided separately from an HDMI cable for connecting the App packet for HDMI encoder and the HDMI source device 24 in the SerDes (node 2) 22 to each other.

However, in the case where an HDMI signal is transmitted in a packet conforming to the ASA standard, there are the following problems.

1. Since an HDMI signal includes a TMDS signal or an FRL signal and the signal forms of the TMDS signal and the FRL signal are different from each other as shown in FIG. 2A, FIG. 2B, FIG. 3, there is a need for a packet structure capable of handling both of the signal forms.

2. There is a need for a packet structure for transmitting TMDS clock frequency information for reproducing a pixel clock on the side of the HDMI Sink device 23.

3. There is a need for a packet structure for transmitting FRL transmission rate information.

4. Since the TMDS signal and the FRL signal are continuous signal in time as shown in 2A, FIG. 2B, and FIG. 3 and signals are transmitted in a time-sharing manner in a TDD communication system conforming to the ASA standard, there is a need for a packet structure that is time-discontinuous.

5. It is necessary to reduce the buffer capacity and conversion latency for signal conversion as much as possible.

6. It is necessary to transmit a DDC signal at the transmission speed of the I2C standard mode (100 kbps) or more.

7. It is necessary to receive an Ack bit of a signal reception response from a Follower within 0.35 msec after an initiator that transmits a CEC signal outputs an Ack bit.

8. It is necessary to supply power to the EDID ROM 4 of the HDMI Sink device 23 upon receiving a +5V power signal.

9. In the case of supporting an ARC function, there is a need for a packet structure for transmitting an IEC 60958 packet in FIG. 37.

A communication apparatus and a communication system according to the present disclosure solve the above-mentioned 1. to 9. problems and are characterized in that an HDMI signal is transmitted in a packet conforming to the ASA standard.

Hereinafter, means for transmitting each of a TMDS signal or FRL signal, a DDC signal, a CEC signal, a +5V power signal, an ARC signal included in an HDMI signal in a packet conforming to the ASA standard will be described in order.

First Embodiment

In a first embodiment, a TMDS signal or FRL signal is transmitted in a packet conforming to the ASA standard.

The communication apparatus and the communication system according to the first embodiment have a block configuration similar to that in FIG. 12 or FIG. 13. The communication apparatus according to the first embodiment is the SerDes (node 1) 21 or the SerDes (node 2) 22 shown in FIG. 12 or FIG. 13. The communication system according to the first embodiment has a configuration similar to that of the SerDes system 20 shown in FIG. 12 or FIG. 13.

Since an HDMI signal is a continuous signal but the SerDes system 20 in FIG. 12 or FIG. 13 adopts a TDD communication system, the Up link and the Down link alternately transmit a packet in a discontinuous manner for each of the respective TDD burst periods. Therefore, it is necessary to convert an HDMI signal that includes a continuous signal into a packet and transmit the packet for each of the discontinuous TDD burst periods.

In the first embodiment, the App packet for HDMI encoder 29h shown in FIG. 12 or FIG. 13 generates a packet that includes an HDMI signal. The PHY_Tx 34 in the SerDes (node 2) 22 transmits a packet to the SerDes (node 1) 21 every 6.844 [µsec], which is a time period obtained by dividing one TDD burst period in a TDD communication system into four, or 3.422 [µsec], which is a time period obtained by dividing one TDD burst period into eight.

More specifically, the App packet for HDMI encoder 31h generates, in the case where the transmission capability of a TMDS signal or FRL signal included in an HDMI signal is 24 [Gbps] or less, a packet that includes TMDS characters in units of 10 bits of a TMDS signal or FRL characters in units of 18 bits of an FRL signal every 6.844 [µsec], which is a time period obtained by dividing one TDD burst period in the ASA standard into four. Further, the App packet for HDMI encoder 31h generates, in the case where the transmission capability of a TMDS signal or FRL signal included in an HDMI signal exceeds 24 [Gbps], a packet that includes TMDS characters in units of 10 bits of a TMDS signal or FRL characters in units of 18 bits of an FRL signal every 3.422 [µsec], which is a time period obtained by dividing one TDD burst period in the ASA standard into eight.

The above-mentioned packet includes, for example, information regarding the number of TMDS characters or FRL characters.

FIG. 14 is a diagram showing an HDMI signal that can be transmitted in one TDD burst period in the ASA standard. Since an HDMI signal is a continuous signal, in order to transmit an HDMI signal in a discontinuous TDD burst period, it is necessary to store an HDMI signal in a buffer memory once, convert the HDMI signal in the buffer memory into a packet in the ASA standard in order from oldest to newest, and transmit the packet for each TDD burst period.

The HDMI has a plurality of standards and the transmission speed differs for each standard. The newer the standard, the higher the transmission speed. As the transmission speed of the HDMI increases, it is necessary to increase the number of lanes and transmission capability of the SerDes system 20 conforming to the ASA standard.

FIG. 14 shows the correspondence between the transmission speed for each standard of the HDMI and the number of transmission lanes and transmission capability of the SerDes system 20 conforming to the ASA standard. In FIG. 14, only combinations described as "OK" are capable of transmitting an HDMI signal by the SerDes system 20. "NA" is an abbreviation of "Non Available" and means a transmission form in which an HDMI signal cannot be normally transmitted.

Figure 15:
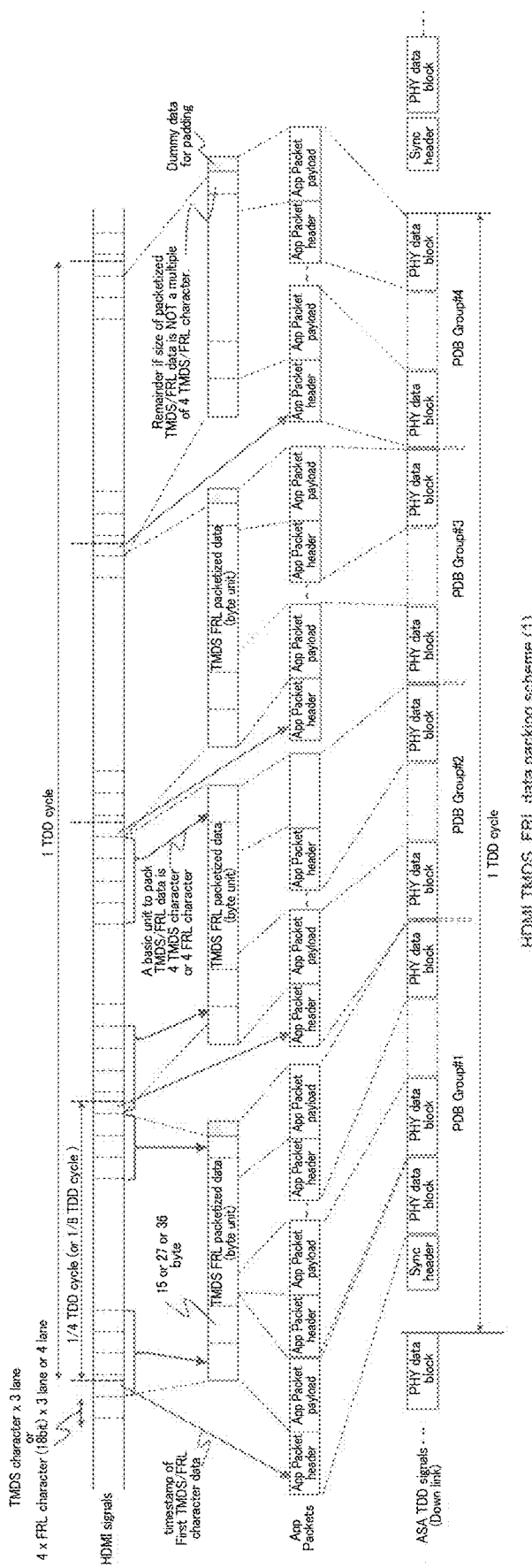
FIG. 15 is a timing chart of packet transmission within one TDD burst period conforming to the ASA standard.

FIG. 15 is a timing chart of packet transmission within one TDD burst period conforming to the ASA standard. FIG. 15 shows an example in which the TMDS signal or FRL signal included in an HDMI signal is included in a packet conforming to the ASA standard and transmitted in one TDD burst period. The TMDS signal is an encoded signal after 8b10b coding. The FRL signal is an encoded signal after 16b18b coding.

The HDMI signal is asynchronous with one TDD burst period and is also asynchronous with the generation timing of a packet conforming to the ASA standard.

As described above, the HDMI has a plurality of standards and the transmission speed differs for each standard. Further, in the ASA, the transmission rate changes depending on whether the number of transmission lanes is one, two, or four.

FIG. 16 is a diagram showing a relationship between the transmission speed of the HDMI transmitted in accordance with the timing shown in FIG. 15 and the number of transmission lanes and transmission capability of the SerDes system 20. In FIG. 16, some of the combinations described as "OK" in FIG. 14 are described as "DU". "DU" is an abbreviation of "don't use" and means not to use although the transmission condition is satisfied.

In the communication system according to the first embodiment, the App packet for HDMI encoder 31h in the SerDes (node 2) 22 shown in FIG. 12 or FIG. 13 packs, in the case where the input TMDS encode signal or FRL 16b18b encode signal is 24.0 [Gpbs] or less, the TMDS encode signal or FRL 16b18b encode signal every 6.844 [used], which is a time period of one-fourth of the ASA TDD cycle (27.376 [usec]). Alternatively, the App packet for HDMI encoder 31h packs, in the case where the input TMDS encode signal or FRL 16b18b encode signal exceeds 24.0 [Gpbs], the TMDS encode signal or FRL 16b18b encode signal every 3.422 [used], which is a time period of one-eighth of the ASA TDD cycle (27.376 [usec]).

Whether the TMDS signal or the FRL signal is divided into four per TDD burst period and packed or divided into eight per TDD burst period and packed is controlled by the TMDS_FRL_mode of TMDS_FRL_control shown in FIG. 41 described below. The TMDS_FRL_mode indicates which of the TMDS signal and the FRL signal is included in an HDMI signal.

FIG. 17 is a diagram showing the total number of PHY data blocks included in one TDD burst period of a Down link in the ASA standard. As shown in FIG. 17, the total number of PHY data blocks included in one TDD burst period of a Down link is 36, 54, and 72 for SG3, SG4, and SG5, respectively. Further, by limiting the number of transmission lanes necessary for transmitting an HDMI signal in the ASA standard to the combinations of "OK" shown in FIG. 16, the total number of PHY data blocks is a multiple of four or eight and the total number of PHY data blocks included in one TDD burst period is a multiple of one, two, or four of the above-mentioned total number as shown in FIG. 17.

As a result, it is possible to divide the HDMI TMDS signal or FRL signal within one TDD burst period (27.376 [usec]), which is a basic transmission unit in the ASA standard, and transmit the right amount of signals by the PHY data block within one TDD burst period.

In this way, it is possible to reduce the capacity of the buffer memory for temporarily storing the HDMI signal and reduce the transmission delay of the HDMI signal.

Figure 18:
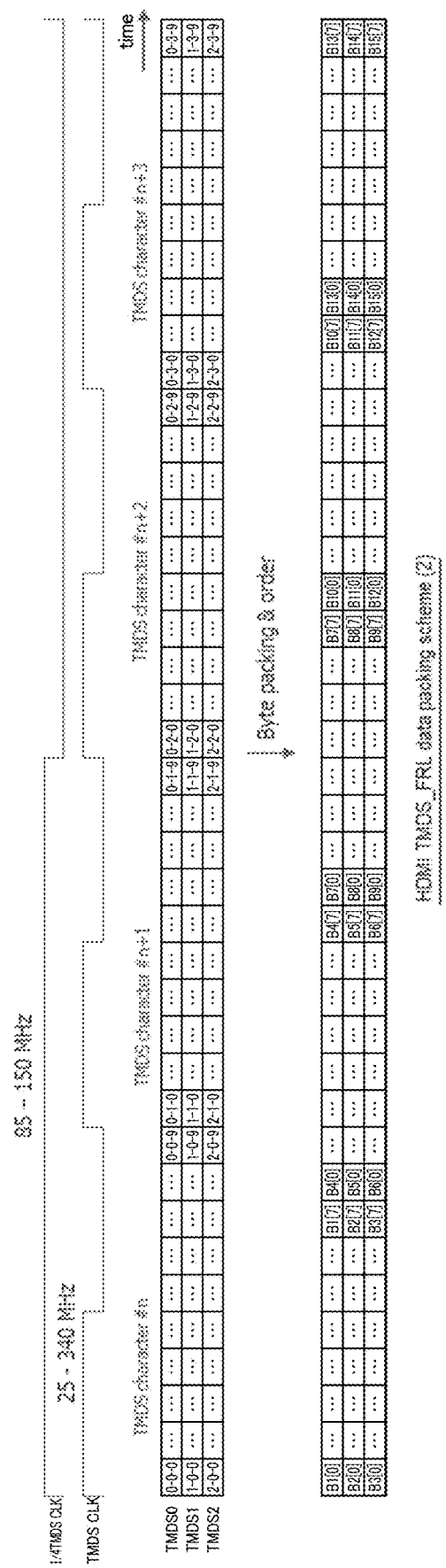
FIG. 18 is a diagram describing a processing operation of packing a TMDS signal included in an HDMI signal to generate a packet.
Figure 19:
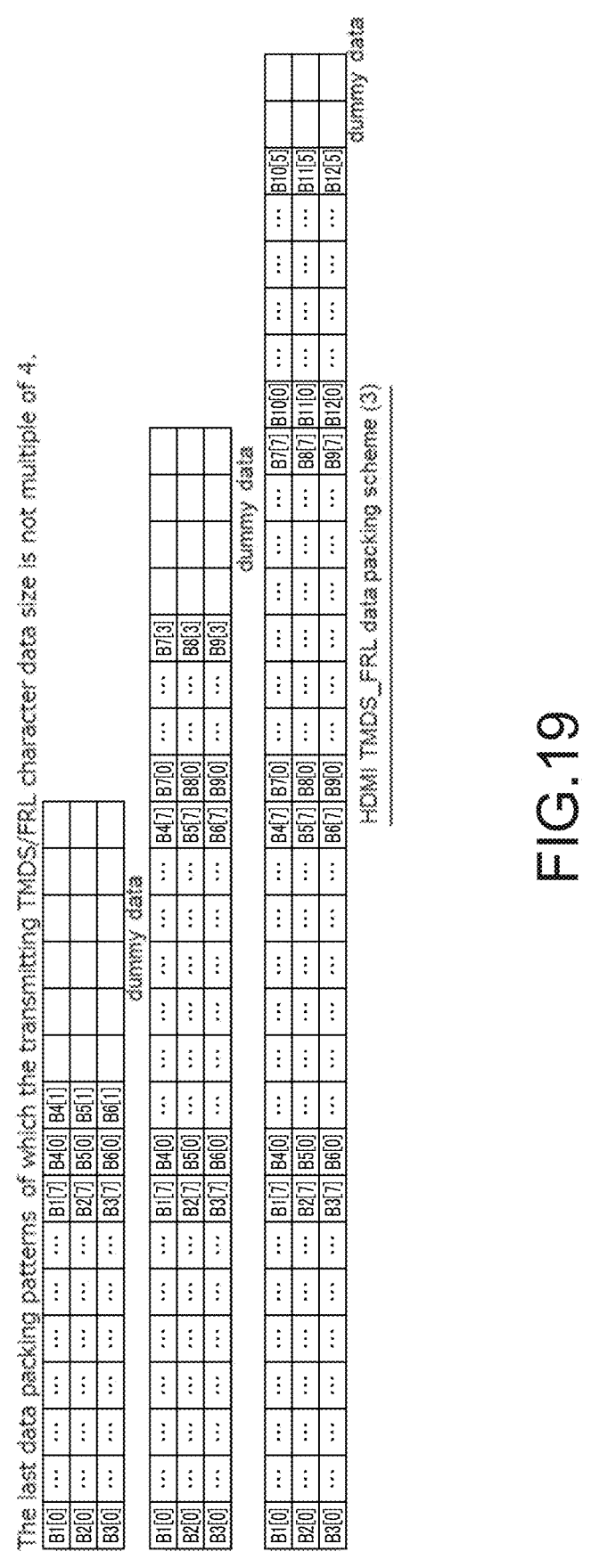
Figure 20:
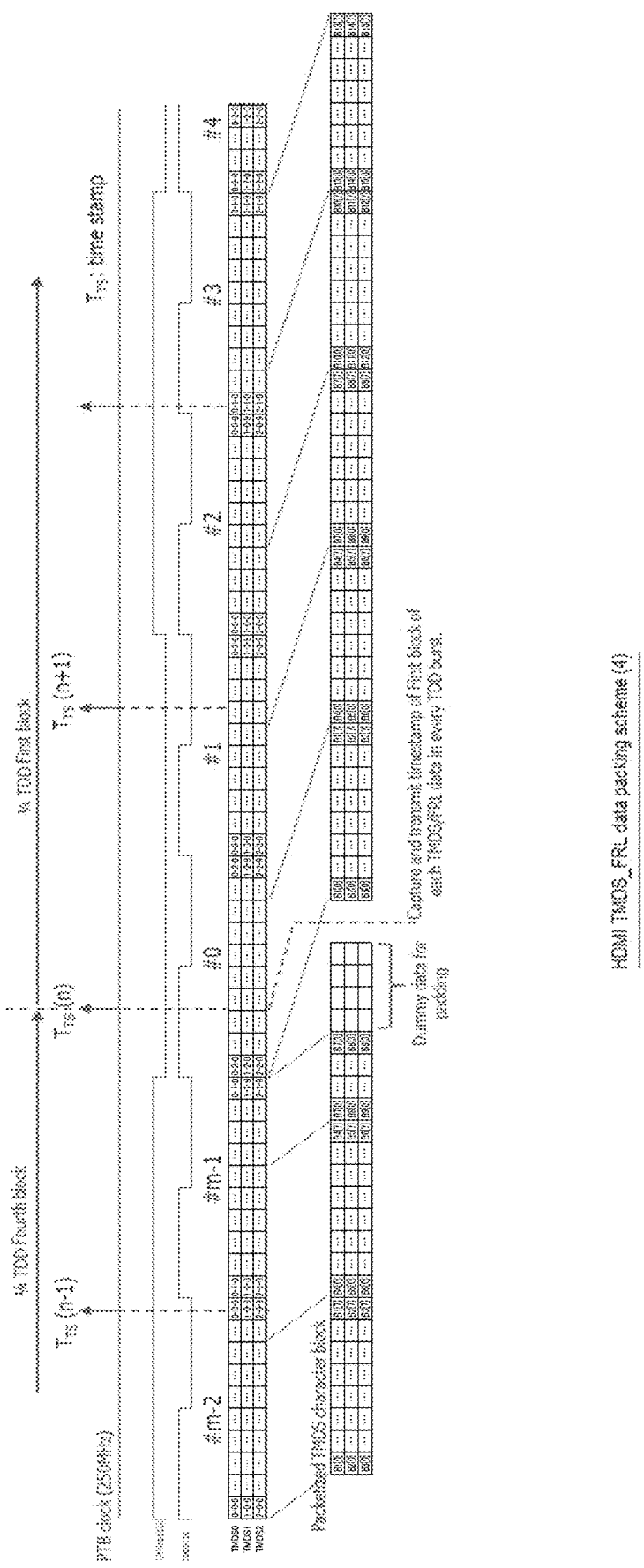
FIG. 20 is a diagram describing a processing operation of packing a TMDS signal included in an HDMI signal to generate a packet.

FIG. 18 to FIG. 20 are each a diagram describing a processing operation of packing a TMDS signal included in an HDMI signal to generate a packet. FIG. 18 to FIG. 20 show an example in which TMDSs 0 to 2 are transmitted using three transmission lanes in the HDMI 2.0. In the case where the TMDS clock is 340 MHz or more, a clock of a frequency of ¼ is generated. A TMDS signal of 10 bytes is input to the App packet for HDMI encoder 29h for each cycle of the TMDS clock. The App packet for HDMI encoder 31h packs each of the TMDS 0, the TMDS 1, and the TMDS 2 in byte units with reference to the rising of the TMDS clock.

B1[0] in FIG. 18 indicates the 0-th bit of a byte #1 of a TMDS signal. Since the TMDS character is in units of 10 bits, in the case of 4 TMDS characters, 40 bit×3 lanes (TMDS 0,1,2)=120 bits, which are 15 bytes. In the case where the number of TMDS characters to be packed is not a multiple of four, the resulting bits are not in byte units. In this regard, as shown in FIG. 19, dummy bits are added to the end of the TMDS character such that the resulting bits are in byte units, and packed for arrangement in byte units.

The TMDS data included in each App packet payload is always in TMDS character units. As a result, the reception side is capable of adjusting, when reproducing a TMDS clock, the rising position of the TMDS clock to the start position of the TMDS character. The number of bytes and the number of TMDS character to be transmitted by each App packet payload are stored as control information in the App packet payload and transmitted as shown in FIG. 35 described below. Details thereof will be described below.

Further, as shown in FIG. 20, the first TMDS character of TMDS characters to be packed every one-fourth or one-eighth of one TDD burst period acquires, as a timestamp, the reference time input to the App packet for HDMI encoder 31h and stores the acquired timestamp in the App packet header shown in FIG. 8. The TMDS clock frequency is represented by the following formula (1) or (2).

[Math. 1]

$$TMDS \text{ clock frequency} = \qquad (1)$$
$$\frac{1}{N} \times \sum_{n=1}^{N-1} \left\{ \left( \text{Number of } TMDS \text{ character in } HDMI \text{ packet} \right. \right.$$
$$\left. \left. \text{of } \frac{1}{4} TDD \text{ cycle } (n) \right) \Big/ \left( N \times \frac{1}{4} TDD \text{ cycle} ( = 6844n \text{ sec}) \right) \right\}$$

$$TMDS \text{ clock frequency} = \qquad (2)$$
$$(\text{total number of } TMDS \text{ character between } T_{TS}(n) \text{ and } T_{TS}(n+m))/$$
$$(T_{TS}(n+m) \times T_{TS}(n))$$

The formula (1) is a formula for calculating the TMDS clock frequency from the number of TMDS character transmitted in one TDD burst period and a plurality of average values thereof.

The formula (2) is a formula for the SerDes (node 1) 21 on the reception side to calculate the TMDS clock frequency by two pieces of transmitted timestamp information and the number of TMDS characters transmitted therebetween.

FIG. 21 to FIG. 24 are each a diagram describing a processing operation of packing an FRI signal included in an HDMI signal to generate a packet. For the FRL signal, the number of FRL lanes is three lanes or four lanes in accordance with the transmission capability. In either case, the FRL signal is input to the App packet for HDMI encoder 31h. The App packet for HDMI encoder 31h packs the FRI signal in byte units for each FRL lane. At this time, the App packet for HDMI encoder 31h packs the FRI signal starting from an arbitrary delimiter position, but may pack the FRI signal in byte units at the FRL character delimiter after 16b18b encode. In either case, the resulting bits are 72 bits corresponding to four FRL characters per FRL lane, which are in byte units.

Figure 21:
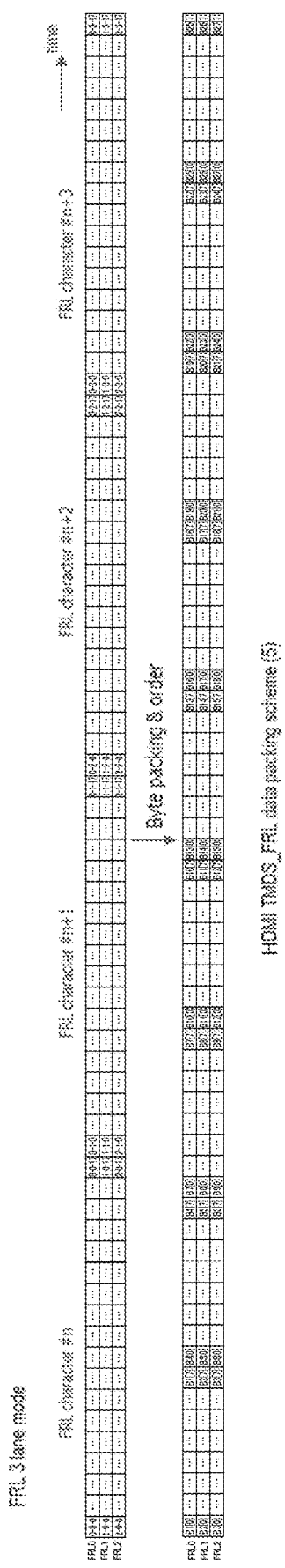
FIG. 21 is a diagram describing a processing operation of packing an FRI signal included in an HDMI signal to generate a packet.
Figure 22:
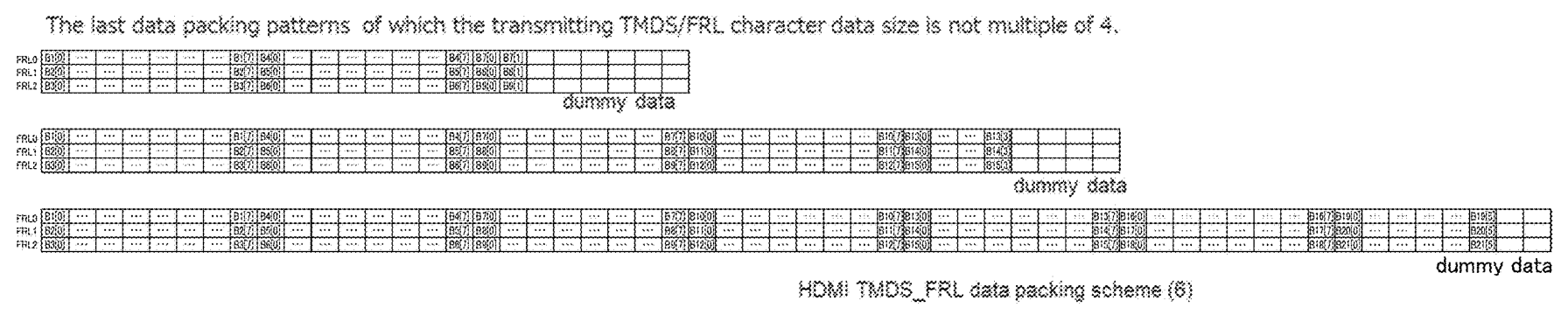

FIG. 21 shows a packing example in the App packet payload in the case of FRL 3 lanes. In the case where the number of pieces of FRL data converted to the number of FRL characters when transmitting to the App packet payload is not a multiple of four, dummy data is packed so as to be in byte units as shown in FIG. 22, resulting in byte units. The FRL data that packs dummy data is FRL data to be transmitted last in one TDD burst period.

Figure 23:
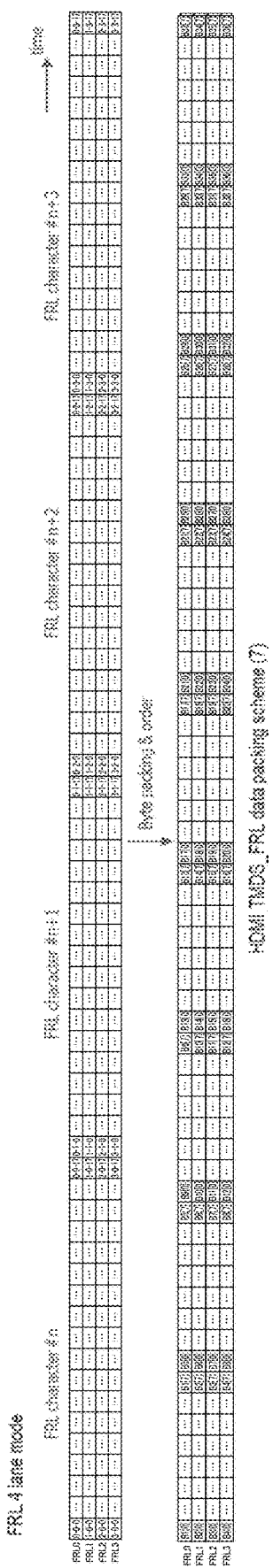
FIG. 23 is a diagram describing a processing operation of packing an FRI signal included in an HDMI signal to generate a packet.

FIG. 23 shows the case where the number of FRL lanes is four lanes, but the packing scheme is similar to that in the case of three lanes. The number of bytes and the number of FRL characters to be transmitted by each App packet payload are stored as control information in the App packet payload and transmitted. Details thereof will be described below.

Figure 24:
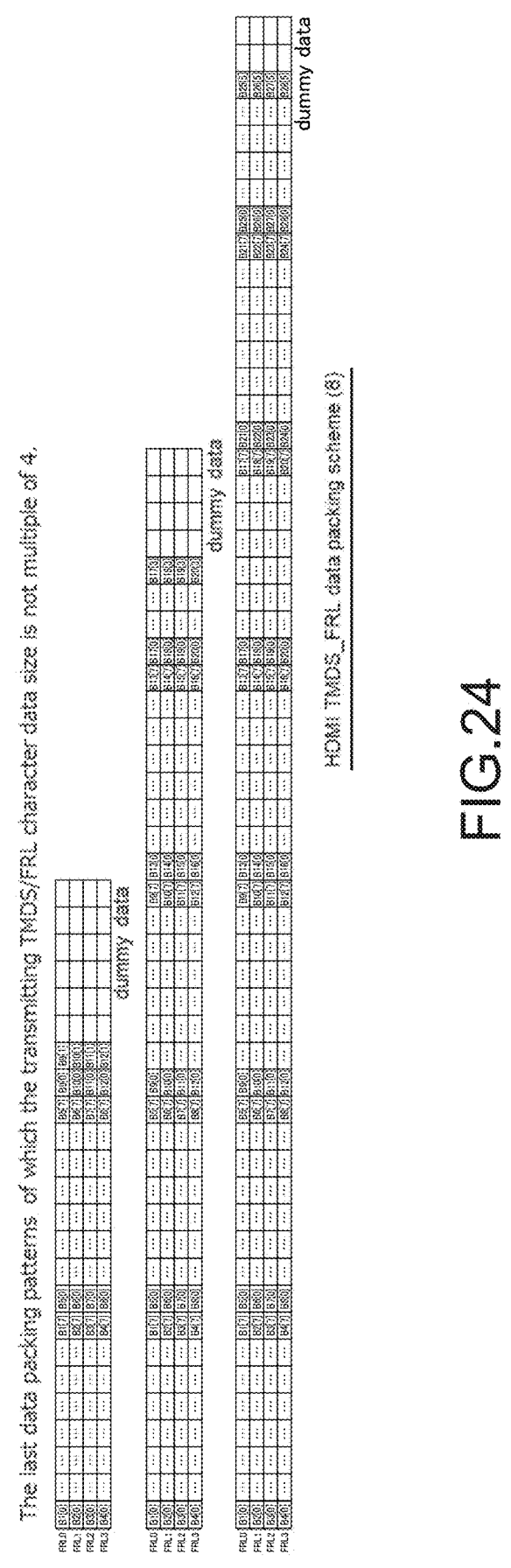

FIG. 22 and FIG. 24 each show a case where the FRL data to be transmitted last in one TDD burst period is less than a predetermined number of bits. In this case, dummy data is added to the end of the FRL data and the FRL data ends at the delimiter position.

Figure 25:
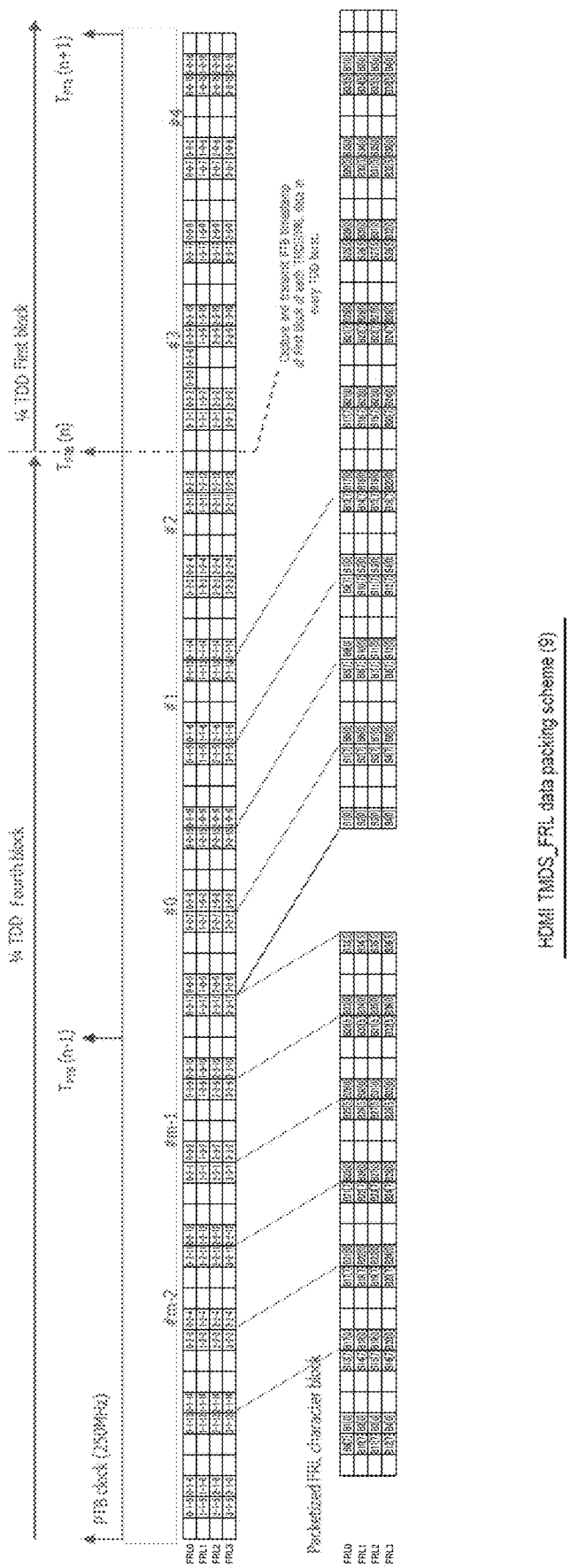
FIG. 25 is a diagram showing the timing at which the first FRL character of FRL characters to be packed every one-fourth or one-eighth of one TDD burst period is input.

FIG. 25 is a diagram showing the timing at which the first FRL character of FRL characters to be packed every one-fourth or one-eighth of one TDD burst period is input. The reference time at which the first FRL character is input to the App packet for HDMI encoder 31h is acquired as a timestamp, stored in the App packet header shown in FIG. 9, and transmitted.

The SerDes (node 1) 21 on the reception side is capable of calculating, on the basis of the formula (3), the FRL transmission rate by two pieces of transmitted timestamp information and the number of FRL characters transmitted therebetween.

[Math. 2]

$$FRL \text{ frequency} = \frac{18}{N} \times \sum_{n=1}^{N-1} \tag{3}$$

$$\left\{\left(\text{Number of } FRL \text{ character in } HDMI \text{ packet of } \frac{1}{4}TDD \text{ cycle } (n)\right)\right\} / \left(N \times \frac{1}{4}TDD \text{ cycle}(= 6844n \text{ sec})\right)$$

Alternatively, the FRL transmission rate may also be calculated from the number of FRL characters transmitted in one TDD burst period and a plurality of average values thereof.

Note that whether to transmit in the TMDS signal mode or the FRL signal mode is determined by the following procedure. The HDMI source device 24 reads, before transmitting a TMDS/FRL data packet, the mode that can be received by the HDMI Sink device 23 from the EDID ROM 4 by the DDC signal described below via the ASA. The HDMI source device 24 sets, on the basis of the read information, the transmission mode of the TMDS FRL data to the App packet payload described below. As a result, whether to transmit in the TMDS signal mode or the FRL signal mode is determined.

In either case of transmitting a TMDS signal or an FRL signal, a common HDMI protocol signal is input to the TMDS encoder 13 and the FRL encoder 15 in the HDMI source device 24 shown in FIG. 5. This signal is called a Try-byte signal in the HDMI specification and is a signal in units of three bytes to be transmitted every TMDS character Period. This Try-byte signal includes Active video pixel data, Control Period Data to be transmitted in a video blanking period, and island data as shown in FIG. 47 described below.

The HDMI sink side receives the TMDS signal or FRL signal, and performs TMDS Decoding processing or FRL Decoding processing thereon to generate a Tri-byte signal. Therefore, an HDMI protocol signal can be transmitted also by extracting this Tri-byte signal, packing it, and transmitting a packet in the ASA standard instead of packing a TMDS signal or FRL signal and transmitting the signal. The packing of a Tri-byte signal will be described below. The App packet for HDMI decoder 28h in the HDMI Sink device 23 decodes the HDMI signal included in the packet received from the HDMI source device 24 by the TDD communication system and reproduces the frequency of one of the TMDS clock and the FML clock on the basis of information regarding the number of TMDS characters or FRL characters per unit time included in the decoded HDMI signal. Further, the App packet for HDMI decoder 28h reproduces a TMDS character period in the case where the decoded HDMI signal includes information regarding the number of TMDS characters per unit time.

As described above, in the first embodiment, a packet in which an HDMI signal that is a continuous signal is packed in the amount that can be transmitted in a time period obtained by dividing one TDD burst period that is a discontinuous period into four or eight is generated and transmitted by the TDD communication system conforming to the ASA standard. As a result, it is possible to rapidly transmit an HDMI signal with the small capacity of the buffer memory.

The transmission speed of the HDMI differs depending on the standard of the HDMI, there are a case where an HDMI signal includes a TMDS signal and a case where an HDMI signal includes an FRI signal, and the signal form and the transmission speed differ between the TMDS signal and the FRI signal. In accordance with the first embodiment, in either case where an HDMI signal includes a TMDS signal or an FRI signal, a packet that includes a TMDS signal or an FRI signal can be transmitted for each TDD burst period in the ASA standard without hindrance. As a result, it is possible to transmit an HDMI signal by the TDD communication system conforming to the ASA standard.

Second Embodiment

A communication apparatus according to a second embodiment transmits a DDC signal included in an HDMI signal in one TDD burst period conforming to the ASA standard. The specific DDC signal is an I2C signal.

Figure 26:
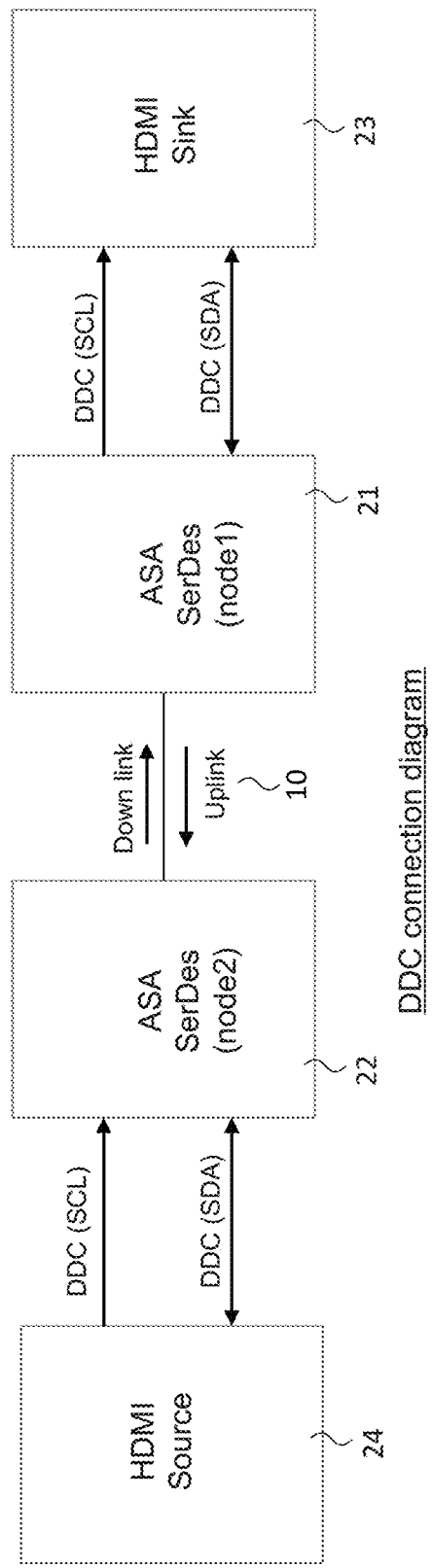
FIG. 26 is a block diagram showing a communication apparatus and a communication system in which a DDC signal included in an HDMI signal is transmitted, simplifying FIG. 9 and FIG. 10.

FIG. 26 is a block diagram showing a communication apparatus and a communication system in which a DDC signal included in an HDMI signal is transmitted, simplifying FIG. 9 and FIG. 10. The communication system shown in FIG. 26 includes the SerDes (node 1) 21 and the SerDes (node 2) 22. The SerDes (node 1) 21 is connected to the HDMI Sink device 23 and the SerDes (node 2) 22 is connected to the HDMI source device 24.

The DDC signal transmitted from the HDMI source device 24 is converted into a packet of the TDD communication system conforming to the ASA standard in the SerDes (node 2) 22 and transmitted to the SerDes (node 1) 21 via a cable. The SerDes (node 1) 21 restores a DDC signal from the received packet and transmits the restored DDC signal to the HDMI Sink device 23. Similarly, the DDC signal transmitted from the HDMI Sink device 23 is converted into a packet of the TDD communication system conforming to the ASA standard in the SerDes (node 1) 21 and transmitted to the SerDes (node 2) 22 via a cable. The SerDes (node 2) 22 restores a DDC signal from the received packet and transmits the restored DDC signal to the HDMI source device 24.

FIG. 27 is a diagram showing a configuration of a packet that includes a DDC signal (hereinafter, referred to as a DDC packet). As shown in FIG. 27, a DDC packet has two bytes. The 0-th bit of the first byte is an I2C Start/Restart bit. The 1st bit is an I2C Stop bit. The 2nd bit is an I2C ACK bit. The 3rd bit is an I2C Nack bit. The 4-th bit is an I2C data flag bit. The 5-th bit is reserved. The 6-th bit is an I2C error bit. The 7-th bit is reserved.

Figure 28:
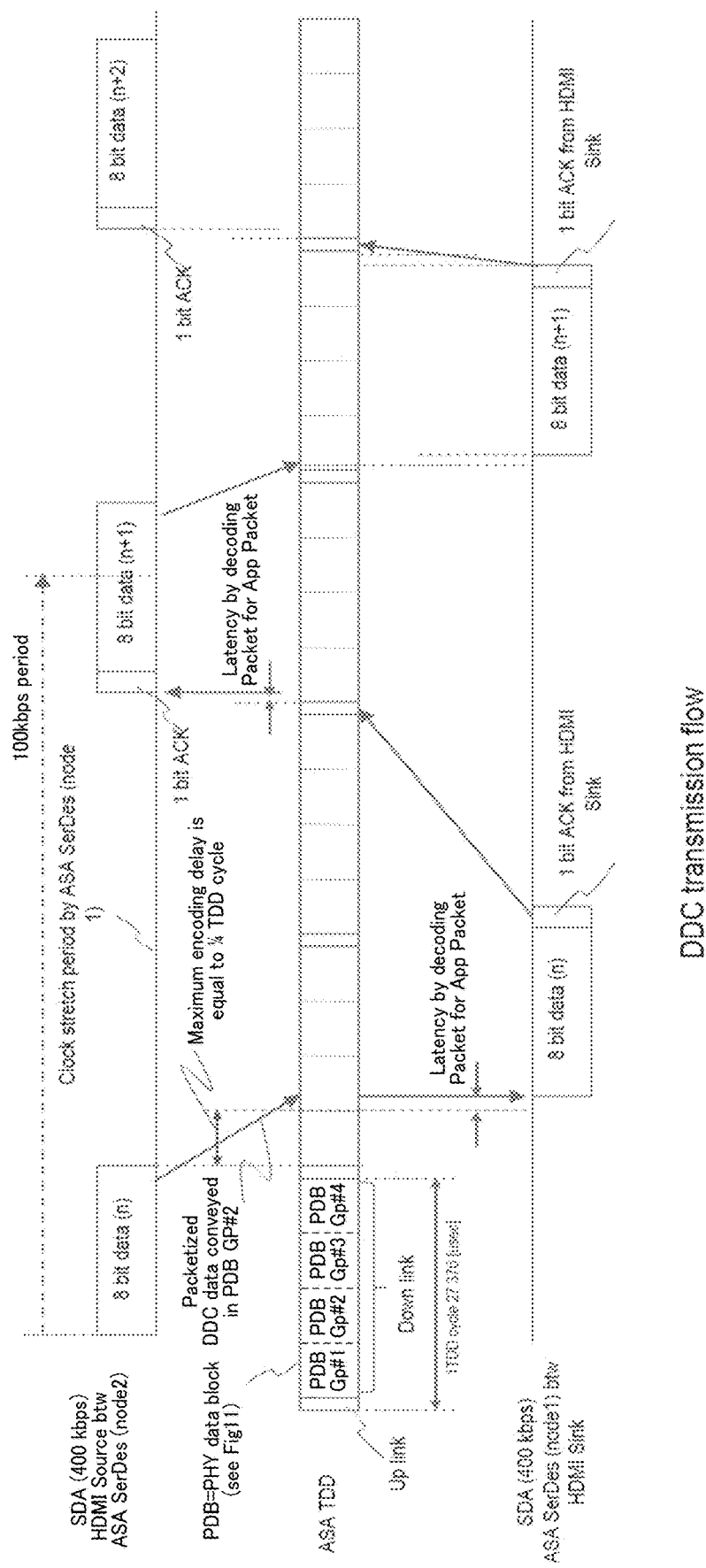
FIG. 28 is a timing chart for transmitting a packet that includes a DDC signal.

FIG. 28 is a timing chart for transmitting a packet that includes a DDC signal. Hereinafter, a processing procedure of transmitting a DCC signal at the transmission speed of the I2C standard mode (100 kbps) or more with reference to FIG. 28.

The DDC communication speed between the HDMI source device 24 and the SerDes (node 2) 22 and between the HDMI Sink device 23 and the SerDes (node 1) 21 is set to at least the I2C Fast-mode (400 kbps) or more. For this reason, the HDMI source device 24 that is a master device of the DDC communication, the HDMI Sink device 23 that is a slave device, and the SerDes (node 1) 21 and the SerDes (node 2) 22 in the ASA standard connected to these devices need to support the I2C transmission mode of the I2C Fast-mode (400 kbps) or more.

As shown in FIG. 15, a packet for transmitting HDMI TMDS_FRL data by dividing one TDD burst period into four or eight in the Down link is capable of including a DDC packet shown in FIG. 27. As a result, as shown in FIG. 28, the maximum packet conversion delay time when transmitting a DDC signal in the TDD burst period conforming to the ASA standard can be one-fourth of one TDD burst period.

The Up link needs to transmit an HDMI packet that includes a DDC packet at least once every two TDD cycles.

By executing the processing described above, it is possible to achieve the transmission speed of 100 kbps or more between the HDMI source device 24 and the HDMI Sink device 23 via the SerDes (node 1) 21 and the SerDes (node 2) 22 in the ASA standard.

As described above, in the second embodiment, since a DDC signal included in an HDMI signal is converted into a packet of the TDD communication system conforming to the ASA standard and transmitted between the SerDes (node 1) 21 and the SerDes (node 2) 22, it is possible to transmit a DDC signal without delay between the HDMI source device 24 and the HDMI Sink device 23.

Third Embodiment

A communication apparatus according to a third embodiment transmits a CEC signal included in an HDMI signal in one TDD burst period conforming to the ASA standard.

Figure 29:
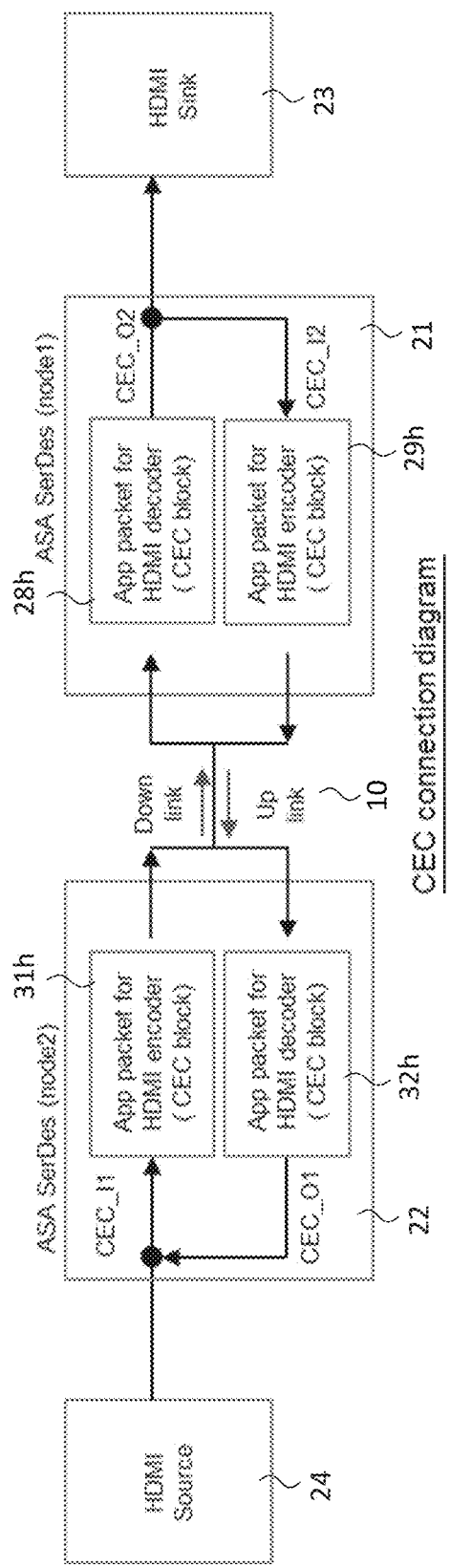
FIG. 29 is a block diagram obtained by simplifying FIG. 12 and FIG. 13.

FIG. 29 is a block diagram obtained by simplifying FIG. 12 and FIG. 13, and shows a block diagram of a communication apparatus and communication system in which a CEC signal is transmitted. The communication system in FIG. 29 includes the SerDes (node 1) 21 and the SerDes (node 2) 22. The SerDes (node 1) 21 is connected to the HDMI Sink device 23 and the SerDes (node 2) 22 is connected to the HDMI source device 24.

The SerDes (node 1) 21 includes the App packet for HDMI encoder 29*h* and the App packet for HDMI decoder 28*h*. Similarly, the SerDes (node 2) 22 includes the App packet for HDMI encoder 31*h* and the App packet for HDMI decoder 32*h*. Both the SerDes (node 1) 21 and the SerDes (node 2) 22 are capable of transmitting a CEC signal. For the CEC signal, a response signal (e.g., ACK signal) from the reception side needs to be received within 0.35 msec. The time period of 0.35 msec is referred to as the turn around time.

FIG. 30 is a diagram showing a configuration of a packet that includes a CEC signal (hereinafter, referred to as a CEC packet). As shown in FIG. 30, the CEC packet has four bytes. The 0-th to 3rd bits of the first byte of the CEC packet indicate values of bits CEC[0] to CEC[3] of the CEC signal. The 4-th to 6-th bits of the first byte are reserved. The 7-th bit of the first byte indicates the number of pieces of sampling data of the CEC signal. The 0-th to 7-th bits of the second to fourth bytes indicate values of CEC[4] and subsequent bits.

Figure 31:
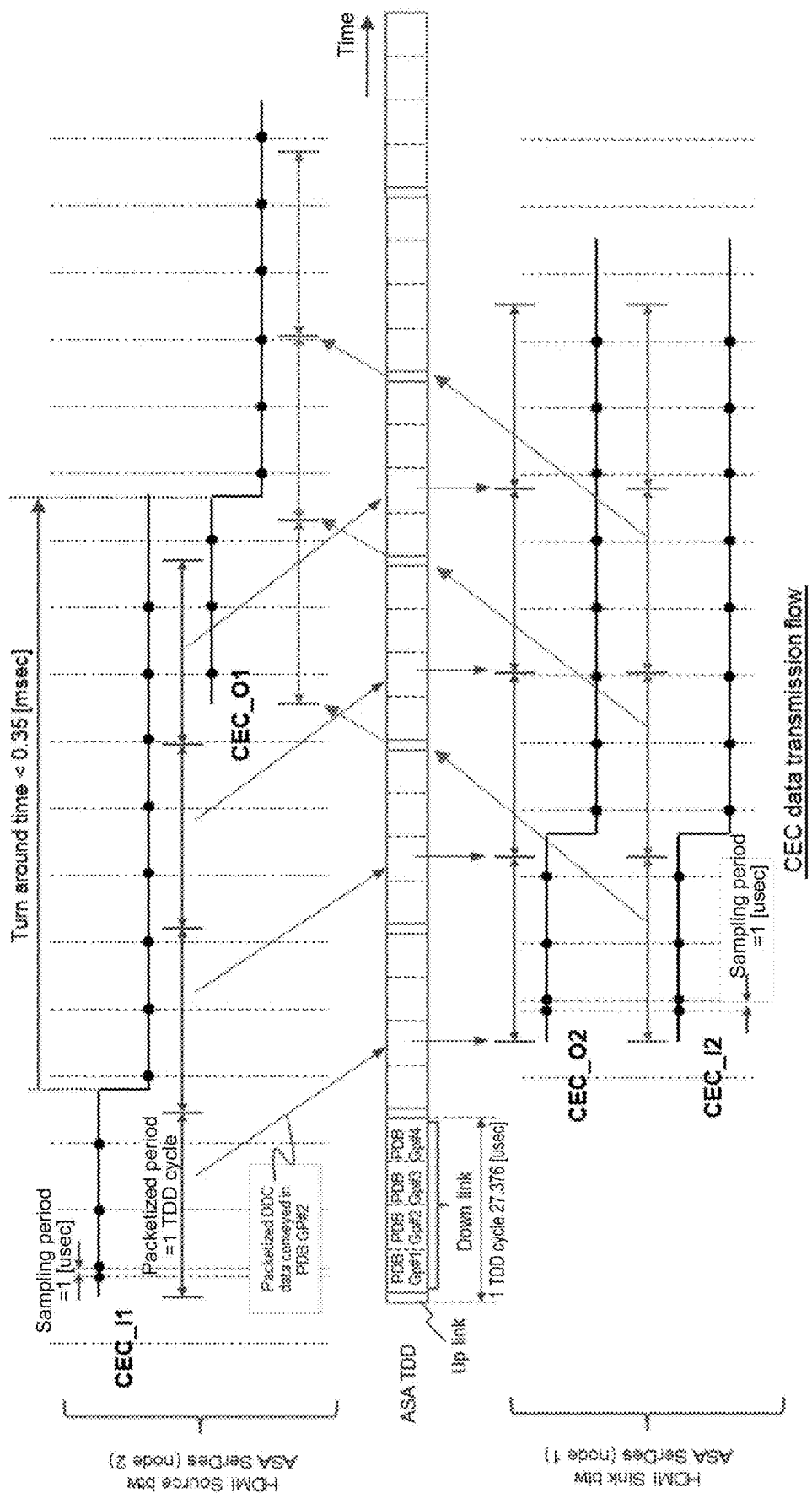
FIG. 31 is a diagram showing the timing at which a packet that includes a CEC signal is transmitted.

FIG. 31 is a diagram showing the timing at which a packet that includes a CEC signal is transmitted. It is necessary to transmit a CEC packet such that a condition that the CEC turn around time is 0.35 msec or less is satisfied.

In the ASA standard, addition of the function for transmitting a GPIO signal from an external device is considered. This function samples the input GPIO signal every one TDD burst period with a reference time shared by the system and packs the signal for transmission. On the reception side, the GPIO signal is reproduced with reference to this reference time.

This function is used for CEC transmission. The sampling frequency is set to 1.0 MHz (1.0 [usec])). As a result, the number of pieces of CEC sampling data to be transmitted by the CEC packet is 27 or 28. The number of pieces of CEC sampling data is stored in Num of CEC data shown in FIG. 30.

As shown in FIG. 15, a packet for transmitting HDMI TMDS_FRL data by dividing one TDD burst period into four or eight in the Down link is caused to be capable of including a CEC packet shown in FIG. 30. As a result, as shown in FIG. 31, the maximum packet conversion delay time when transmitting a CEC signal in the ASA TDD cycle cane be one-fourth of one TDD burst period, similarly to the case of the DDC signal transmission.

Meanwhile, the Up link needs to transmit an HDMI packet that includes a DDC packet shown in FIG. 27 at least once every two TDD cycles.

By executing the processing described above, it is possible to make the turn around time of an Ack signal, which is the strictest time constraint, 0.35 msec or less between the HDMI source device 24 and the HDMI Sink device 23 via the ASA SerDes devices 21 and 22.

FIG. 31 shows an example in which the HDMI source device 24 connected to the SerDes (node 2) 22 transmits a CEC signal CEC_I1. A CEC packet that includes CEC_I1 is transmitted to the SerDes (node 1) 21 in one-fourth of one TDD burst period of the Down link. The SerDes (node 1) 21 restores a CEC packet and transmits a CEC signal CEC_O2 to the HDMI Sink device 23. The HDMI Sink device 23 transmits a CEC signal CEC_I2 that is an ACK signal. A CEC packet that includes CEC_I2 is transmitted to the SerDes (node 2) 22 in one TDD burst period of the Up link. The SerDes (node 2) 22 restores a CEC packet and transmits a CEC signal CEC_O1 to the HDMI source device 24. At this time, in accordance with this embodiment, it is possible to keep the time difference from the signal transition timing of CEC_I1 to the signal transition timing of CEC_O1 within 0.35 msec.

As described above, in the third embodiment, a CEC signal included in an HDMI signal can be included in a packet of the TDD communication system conforming to the ASA standard and transmitted. Although there is a limitation that a response signal needs to be received within 0.35 msec for the CEC signal, a packet can be transmitted/received so as to satisfy this limitation in accordance with this embodiment.

Fourth Embodiment

In a fourth embodiment, a +5V signal included in an HDMI signal is transmitted in a packet conforming to the ASA standard.

Figure 32:
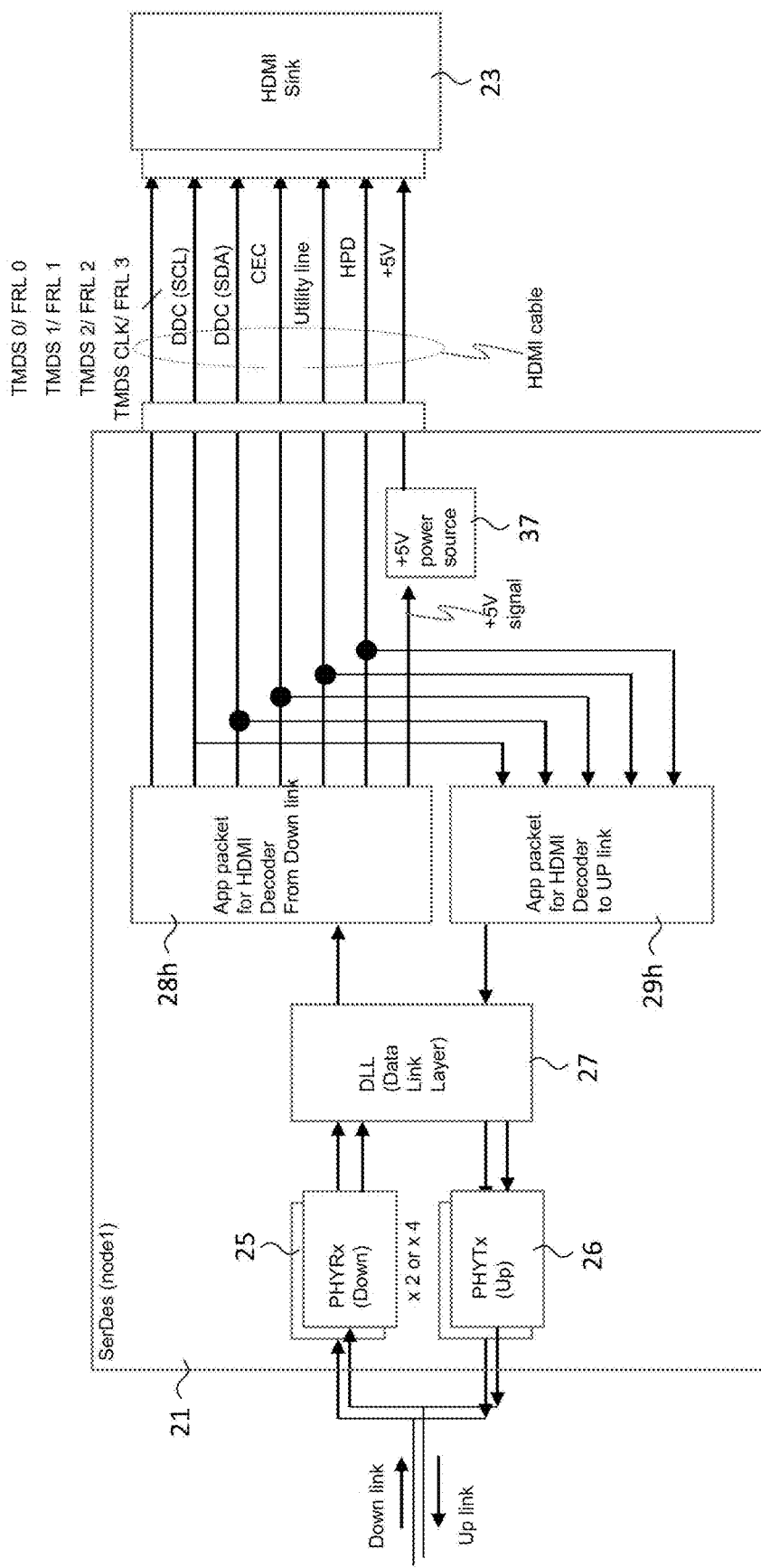
FIG. 32 is a block diagram showing an internal configuration of a SerDes (node 1) according to a fourth embodiment.

FIG. 32 is a block diagram showing an internal configuration of the SerDes (node 1) 21 according to the fourth embodiment. The SerDes (node 1) 21 in FIG. 32 includes the PHY_Rx 25, the PHY_Tx 26, the DLL 27, the App packet for HDMI encoder 29*h*, the App packet for HDMI decoder 28*h*, and a +5V power source 37. The SerDes (node 1) 21 is connected to the HDMI Sink device 23.

The App packet for HDMI decoder 28*h* of the SerDes (node 1) 21 receives a packet that includes a +5V signal via a down link conforming to the ASA standard, turns on the +5V power source 37 thereof or an external +5V power source 37 in the case where the +5V signal is at a High level, and supplies a +5V power signal of 5 V/55 mA according to the HDMI standard to the HDMI Sink device 23 via an HDMI cable. This +5V power signal enables reading of the EDID ROM 4 even while the HDMI Sink device 23 is inactive.

The HDMI Sink device 23 sends back the +5V power signal supplied from the SerDes (node 1) 21 to the SerDes (node 1) 21 as an HPD signal. The SerDes (node 1) 21 generates a packet that includes an HPD signal and transmits the generated packet to the SerDes (node 2) 22 in one TDD burst period of the Up link. The SerDes (node 2) 22 restores an HPD signal from the received packet and transmits the restores HPD signal to the HDMI source device 24. The HDMI source device 24 recognizes, upon receiving the HPD signal, that the HDMI Sink device 23 is connected thereto.

As described above, in the fourth embodiment, since a +5V signal or HPD signal included in an HDMI signal is included in a packet of the TDD communication system conforming to the ASA standard and transmitted, it is possible to perform processing similar to hot plug detection using an HDMI cable between HDMI devices, without delay via the TDD communication system.

Fifth Embodiment

In a fifth embodiment, an ARC signal included in an HDMI signal is transmitted in a packet conforming to the ASA standard.

The ARC signal is originally a signal that is transmitted from the HDMI Sink device 23 to the HDMI source device 24. In the case where the ARC signal is transmitted in a packet of the TDD communication system conforming to the ASA standard, the packet is transmitted in the Up link from the SerDes (node 1) 21 to the SerDes (node 2) 22. In the case where an ARC signal is packetized, it is necessary to adopt the format of an IEC 60958 packet.

FIG. 33 is a diagram describing the format of an IEC60598 packet. The IEC60598 packet includes a frame that includes two sub-frames. Each frame is audio sampling data. The frame rate is the same as the audio sampling rate in the case where linear audio sampling data is transmitted. Each sub-frame includes Sync preamble, Aux, Audio sampling data, Validity flag, User data, Channel status, and parity bit. The sub-frame of IEC 60958 includes 32 timeslots. One block includes 192 frames.

Figure 34:
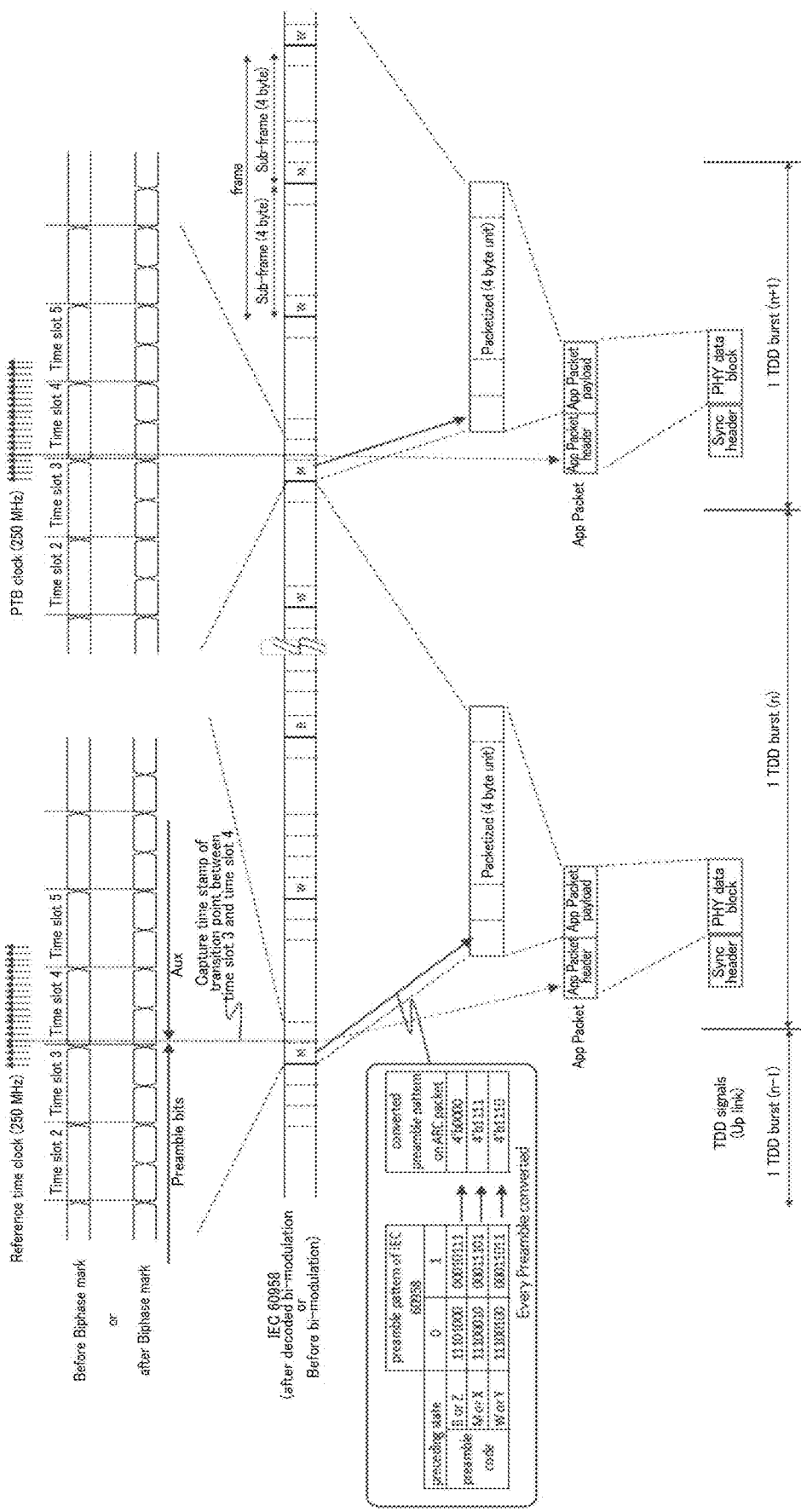
FIG. 34 is a timing chart in the case where an ARC signal of the IEC 60958 standard is transmitted in a packet in the ASA standard.

FIG. 34 is a timing chart in the case where an ARC signal of the IEC 60958 standard is transmitted in a packet in the ASA standard.

Since IEC 60958 data is biphase mark encoded on the physical layer, each timeslot has 2-bit data. Further, an 8-bit preamble pattern is assigned to the first four timeslots of the subframe after the biphase mark encoding.

When transmitting IEC 60958 data in a packet conforming to the ASA standard, the data is packed in units of subframes including 32 bits before the biphase mark encoding or after the biphase mark decoding. As shown in FIG. 34, 8-bit preambles of three patterns assigned to the time slots 0 to 3 of the subframe are each assigned to a 4-bit code. As a result, since the subframe of the IEC 60958 data to be packed is in units of four bytes, the packing is made easier.

Since the data is packed in units of subframes, the reception side is capable of easily determining the delimiter of each subframe. Further, even in the case where an error has occurred for some reasons in the preamble code converted into four bits, it is possible to easily distinguish the subframe type from other types because the 4-bit code "0000" assigned to the "B" preamble indicating the head of the IEC 60958 block and the other four-bit codes "1111" and "1110" respectively assigned to "M" and "W" distinguishing subframes in Frames are away from each other by the Hamming distance of three or more.

FIG. 35 is a diagram showing a configuration of a packet that includes an ARC signal (hereinafter, referred to as an ARC data packet). More specifically, FIG. 35 shows a configuration in which an IEC 60958 sub-frame is packed conforming to the ASA standard. As shown in FIG. 35, the ARC data packet has four bytes. The field of the bits [7:4] of the first byte is auxiliary sample bits [3:0]. This field transmit four bits in the timeslots 4 to 7 of the IEC 60958 subframe. These four bits are designated auxiliary sample bits. In the case where the audio sample word is 24 bits, the auxiliary sample bits are assigned as the lowest four bits of the audio sample word. The bits [3:0] of the first byte are a sync preamble [3:0]. The sync preamble [3:0] is '0000', '1111', and '1110' in the case where the preamble code is B or Z, M or X, and W or Y, respectively.

The second byte is an Audio sample word [7:0] and the third byte is an Audio sample word [15:8]. They are each an audio sample word of a subframe. The Audio sample word is transmitted in the timeslots 8 to 27 of the subframe. The LSB of the audio sample word in the timeslot 8 is transmitted as the audio sample word [0] of this field.

The bit 7 of the fourth byte is a parity bit. The parity bit is transmitted in the timeslot 31 of the subframe. The bit 6 is a channel status. The channel status bit is transmitted in the timeslot 30 of the subframe. The bit 5 is user data. The user data is transmitted in the timeslot 29 of the subframe. The bit 4 is a validity flag. The validity flag is transmitted in the timeslot 28 of the subframe. The bits [3:0] are an Audio sample word [19:16] and are an audio sample word of the subframe. The Audio sample word is transmitted in the timeslots 8 to 27 of the subframe. The MSB of the audio sample word of the timeslot 27 is transmitted as the audio sample word [19] of this field.

The validity flag include in the fourth byte in FIG. 35 may be used as the bits for informing, in the case where it has been detected that an error has occurred in an application packet during transmission in the ASA standard, the subsequent processing of that the data is unreliable.

Further, as the processing of reproducing the audio sampling rate on the reception side, the timestamp of the time when the timeslot 4 of the first IEC 60958 subframe stored in each App packet was input to the App packet encoder 29 is stored in the header of the packet and transmitted.

By executing the processing described above, it is possible to transmit an ARC (IEC 60958) signal conforming to the ASA standard in the Up link of the TDD communication system.

As described above, in the fifth embodiment, the ARC signal to be transmitted by the HDMI Sink device 23 to the HDMI source device 24 can be transmitted in a packet that conforms to the ASA standard and is in the data format of IEC 60958, in the Up link of the TDD communication system.

Sixth Embodiment

A sixth embodiment shows a configuration of an entire packet that includes each signal included in the HDMI signal described in the above-mentioned first to fifth embodiments.

Figure 36:
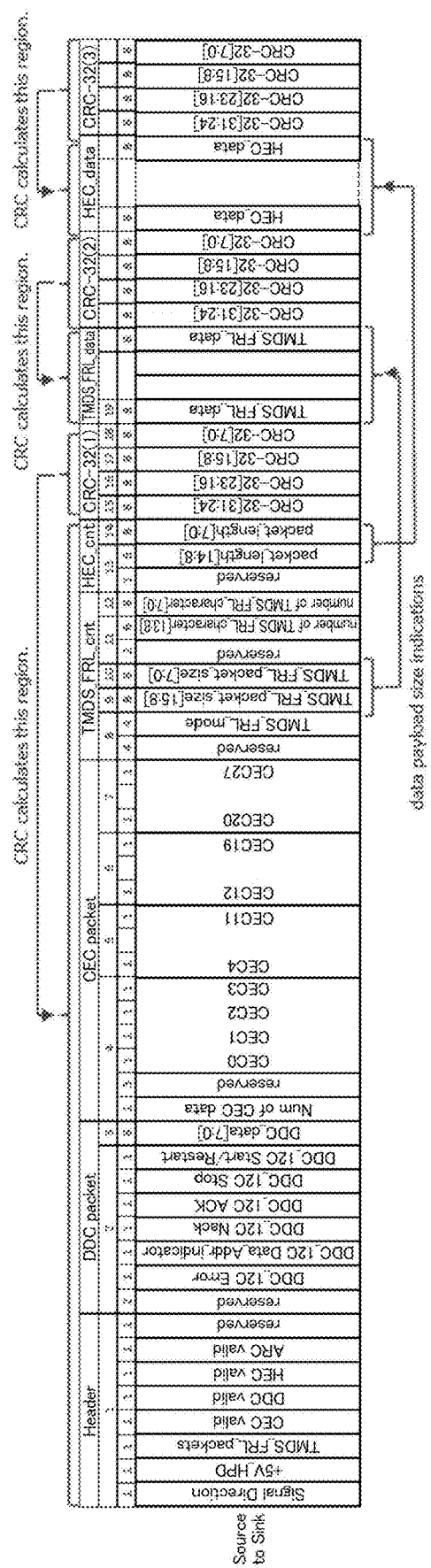
FIG. 36 is a diagram showing a configuration of an entire Down link packet of a TDD communication system conforming to the ASA standard.
Figure 37:
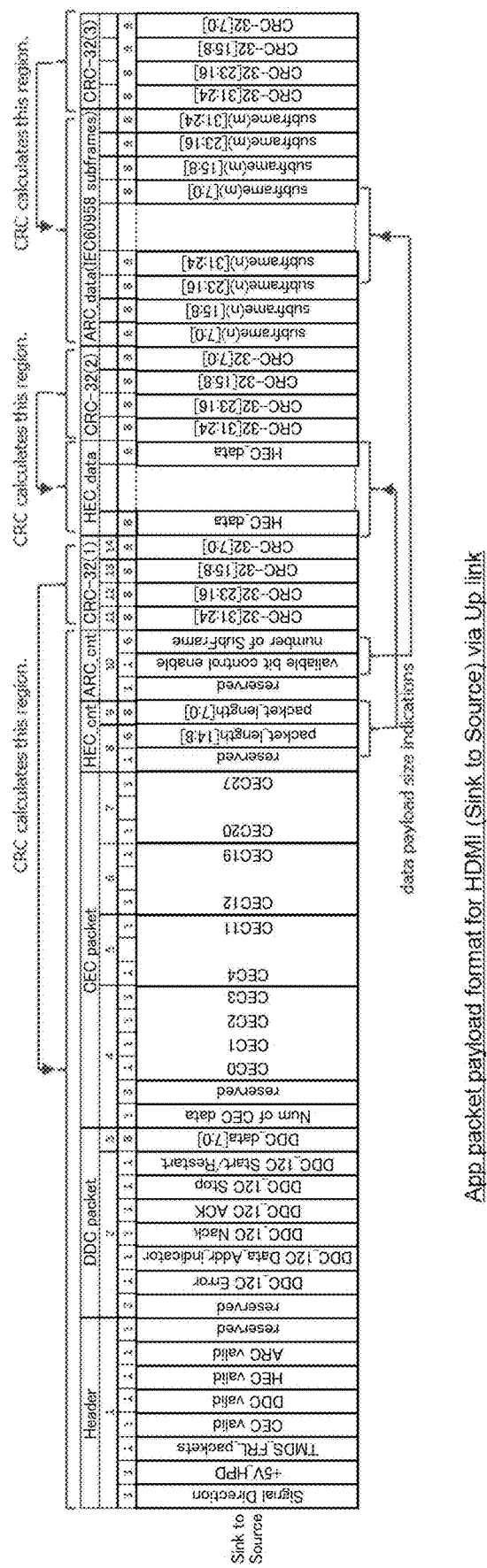
FIG. 37 is a diagram showing a configuration of an entire Up link packet of a TDD communication system conforming to the ASA standard.

FIG. 36 is a diagram showing a configuration of an entire packet to be transmitted in a Down link of a TDD communication system conforming to the ASA standard (hereinafter, referred to as a Down link packet). FIG. 37 is a diagram showing a configuration of an entire packet to be transmitted in an Up link of a TDD communication system conforming to the ASA standard (hereinafter, referred to as an Up link packet).

The packets shown in FIG. 36 and FIG. 37 each include a Header, a DDC packet, and a CEC packet. The configurations of the Header, the DDC packet, and the CEC packet are common in FIG. 36 and FIG. 37.

More specifically, the packet shown in FIG. 36 includes a Header, a DDC packet, a CEC packet, TMDS_FRL_cnt, HEC_cnt, CRC-32(1), TMDS_FRL_data, CRC-32(2), HEC_data, and CRC-32(3). The CRC-32 (1) is an error detection code for the Header, the DDC packet, the CEC packet, the TMDS_FRL_cnt, and the HEC_cnt. The CRC-32(2) is an error detection code for the TMDS_FRL_data. The CRC-32(3) is an error detection code for the HEC_data. The 9-th to 10-th bytes of the TMDS_FRL_cnt indicate the payload size of the TMDS_FRL_data. The 13-th to 14-th bytes of the HEC_cnt indicate the payload size of the HEC_data.

The packet shown in FIG. 37 includes a Header, a DDC packet, a CEC packet, HEC_cnt, ARC_cnt, CRC-32(1), HEC_data, CRC-32(2), ARC_data, and CRC-32(3). The CRC-32(1) is an error detection code for the Header, the DDC packet, the CEC packet, the HEC_cnt, and the ARC_cnt. The CRC-32(2) is an error detection code for the HEC_data. The CRC-32(3) is an error detection code for the ARC_data. The 9-th to 10-th bytes of the HEC_cnt indicate the payload size of the HEC_data. The 13-th to 14-th bytes of the ARC_cnt indicate the payload size of the ARC_data. As described above, the CRC-32(1) is provided to improve the reliability of control system signals.

FIG. 38 is a diagram showing a configuration of the Header of a Down link packet and an Up link packet. The Signal Direction of the Header (FIG. 38) selects a structure of the CEC packet and subsequent ones. The +5V_HPD transmits a +5V signal of an HDMI signal in the packet from a source to a sink, and transmits an HPD signal in the packet from a sink to a source. The subsequent TMDS_FRL_packets, HEC valid, and ARC valid respectively indicate whether or not a TMDC/FRL packet, an HEC packet, and an ARC packet is included in this app packet payload. The CEC valid and the DDC valid respectively indicate whether or not a valid DDC packet and a valid CEC packet are included.

More specifically, in the case where the Signal direction of the bit 7 in FIG. 38 is one, the signal direction is from a source to a sink. The HDMI packet is capable of transmitting TMDS/FRL data. In the case where the Signal direction is 0, the signal direction is from a sink to a source. The HDMI is not capable of transmitting TMDS/FRL data. The +5V_HPD of the bit 6 transmits +5V in the case where the signal direction is set to one and transmits an HPD in the case where the signal direction is set to zero. The following packets transmit TMDS_FRL data packets in the case where the TMDS_FRL_packets of the bit 5 is one, and the following packets do not transmit TMDS_FRL data packets in the case where the TMDS_FRL_packets of the bit 5 is zero. This field needs to be set to zero in the case where the signal direction is set to zero. The following CEC packet is valid in the case where the CEC_Valid of the bit 4 is one, and the following CEC packet is not valid in the case where the CEC Valid of the bit 4 is zero. This means that the CEC signal level is kept at the same level as before. The following DDC packet is valid in the case where the DDC Valid of the bit 3 is one, and the following DDC packet is not valid in the case where the DDC Valid of the bit 3 is zero. This means that the DDC signal level is kept at the same level as before. The HEC packet is transmitted in the case where the HEC valid of the bit 2 is one and there is no HEC packet in the case where the HEC valid of the bit 2 is zero. The ARC packet is transmitted in the case where the ARC valid of the bit 1 is one, and there is no ARC packet in the case where the ARC valid of the bit 1 is zero. This field needs to be set to zero in the case where the signal direction is set to one. The bit 0 is reserved (for HEC or ARC).

FIG. 39 is a diagram showing a configuration of a DDC packet. The DDC packet is disposed at the second to third bytes of a Down link packet and an Up link packet. The bits [7:6] of the second byte are reserved. The bit 5 is a DDC_I2C error, and one and zero thereof respectively indicate I2C bus hangup and no error. The bit 4 is an DDC_I2C data_Addr_indicator, one and zero thereof respectively indicate data detected (payload byte follows) and not detected (no following payload data). The bit 3 is a DDC_I2C Nack, one and zero thereof respectively indicate Nack detected and not detected. The bit 2 is a DDC_I2C Ack, and one and zero thereof respectively indicate Ack detected and not detected. The bit 0 is a DDC_I2C Start/Restart, and one and zero thereof respectively indicate Start/Restart detected and not detected. The bits [7:0] of the third byte are DDC_data, and indicate slave address, offset address, and wdata, or rdata.

FIG. 40 is a diagram showing a configuration of a CEC packet. The CEC packet is disposed at the fourth to seventh bytes of a Down link packet and an Up link packet. The bit 7 of the fourth byte is Num of CEC data, which represents the number of pieces of sampled CEC data in a TDD period to transmit. One and zero of the Num of CEC data respectively indicate 28 data and 27 data. The bits [6:4] are reserved. The bits [3:0] are CEC [0:3]. The bits [7:0] of the fifth to seventh bytes are CEC [8*(n−1)+11] to CEC [8*(n−1)+4], n being 1, 2, and 3. The bits [3:0] of the fourth byte and the fifth to the seventh bytes are each CEC sampled data of one TDD cycle. The sampling rate is 1 MHz. The total number of pieces of sampled CEC data in the TDD cycle is 27 or 28 samples. The CEC [0] is first data, and the CEC [26] or CEC [27] is the last data of this data block.

In the case where the DDC packet (FIG. 39) and the CEC packet (FIG. 40) are transmitted, four or eight App packet payloads are transmitted in one TDD burst period as shown in FIG. 28 and FIG. 31, but the DDC packet and the CEC packet are transmitted by one of the App packet payloads. At this time, the CEC valid and the DDC valid are "1" (valid).

Meanwhile, in the case where the CEC valid and the DDC valid are "0", a DDC packet and a CEC packet including valid data are transmitted. In the case of receiving the invalid data, the reception side outputs Hiz to the connected HDMI device in both a CEC packet and a DDC packet.

FIG. 41 is a diagram showing a configuration of TMDS_FRL_control. The TMDS_FRL_control is disposed at the 8-th to 12-th bytes of a Down link packet. The bit [7:4] of the eighth byte are reserved. The bits [3:0] indicate TMDS_1 (TMDS clock rate=1×TMDS characters), TMDS_2 (TMDS clock rate=0.25×TMDS characters), FRL3lane_3G, FRL3lane_6G, FRL4lane_6G, FRL4lane_8G, FRL4lane_10G, and FRL4lane_12G, in the case where they are 0000, 0001, 0010, 0011, 0100, 0101, 0110, and 0111, respectively. The other bit string is reserved. The bits [7:0] of the 9-th byte are TMDS_FRL_packet_size [15:8], and the bits [7:0] of the 10-th byte are TMDS_FRL_packet_size [7:0]. The 9-th to 10-th bytes represent the number of TMDS_FRL data packets of this packet in byte units. The bits [7:6] of the 11-th byte are reserved, the bits [5:0] are TMDS_FRL_character [13:8], and the bits [7:0] of the 12-th byte are TMDS_FRL_character [7:0]. In the 11-th to the 12-th bytes, the number of TMDS_FRL characters are transmitted in this packet. The character is 10 bits in the case where the HDMI is the TMDS mode and the character is 18 bits in the case where the HDMI is the FRL mode.

The TMDS_FRL_mode indicates the TMDS type or the FRL type of TMDS_FRL_data to be transmitted by this App packet payload. The TMDS_FRL_control transmits the number of packets of TMDS_FRL_data to be transmitted by this App packet payload, and the number of TMDS or FRL characters. The reception side correctly decodes the TMDS signal or the FRL signal by this field.

FIG. 42 is a diagram showing a configuration of an HEC_control packet. The HEC_control packet is disposed at the 13-th to the 14-th bytes of a Down link packet and the 8-th to the 9-th bytes of an Up link packet. The bit 7 of the 13 (8)-th byte is reserved, and the bits [6:0] are packet_length [14:8]. The bits [7:0] of the 14 (9)-th byte are packet_length [7:0]. The packet_length is the byte length of s payload.

FIG. 43 is a diagram showing a configuration of an ARC_control packet. The ARC_control packet is disposed at the 10-th byte of an Up link packet. The bit 7 is reserved. The bit 6 is variable bit control enable, and one thereof enables to set the validity flag (V) of a subframe in the case where a CEC32 calculation result shows an error. The bit [5:0] is the number of subframes and indicates the number of subframes to be transmitted in the following packet (the maximum sampling rate of audio data is 192 kbps due to the maximum number of this field).

The HEC_control packet and the ARC_control packet respectively indicate, in the case where there are respective packets, the number of HEC packets and the number of ARC packets to be transmitted by this App packet payload.

As described above, in the sixth embodiment, by transmitting the packet having the configuration shown in FIG. 36 and FIG. 37 by the TDD communication system, it is possible to transmit an arbitrary type of signal defined in the HDMI standard in a packet conforming to the ASA standard.

Seventh Embodiment

In a seventh embodiment, a packet of a TDD communication system that includes a Try-byte signal instead of the TMDS signal and the FRI signal is transmitted.

Figure 44:
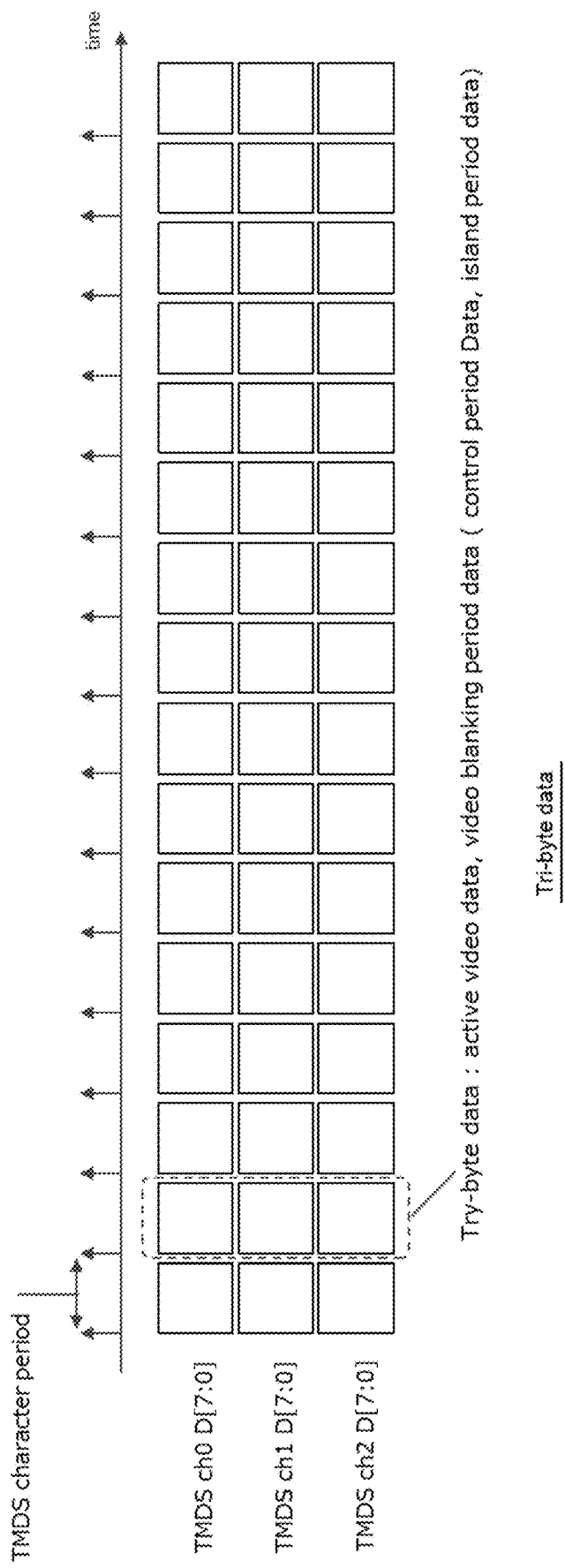
FIG. 44 is a diagram showing a Try-byte signal output from the HDMI protocol encoder shown in FIG. 5.

FIG. 44 is a diagram showing a Try-byte signal output from the HDMI protocol encoder 12 shown in FIG. 5. The Try-byte signal includes TMDS ch0 D[7:0], TMDS ch1 D[7:0], and TMDS ch2 D[7:0]. The 1-byte signal of each channel is referred to as Try-byte data. The Try-byte data includes active video data and video blanking period data. Further, the Try-byte data includes control period data and island period data in some cases.

Figure 45:
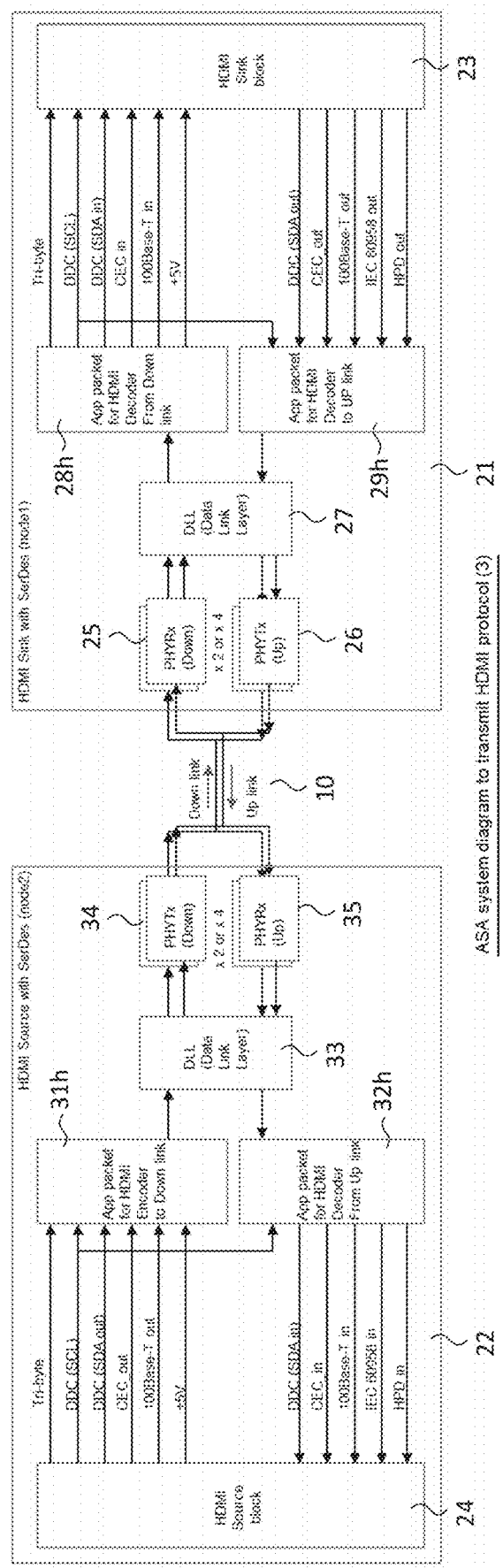
FIG. 45 is a block diagram of a communication apparatus and communication system in which a packet that includes a Try-byte signal is transmitted.

FIG. 45 is a block diagram of a communication apparatus and a communication system in which a packet that includes a Try-byte signal is transmitted. FIG. 45 is different from FIG. 13 in that the HDMI source device 24 transmits a Try-byte signal instead of outputting a TMDS/FML signal and the HDMI Sink device 23 receives a Try-byte signal instead of receiving a TMDS/FML signal.

Figure 46:
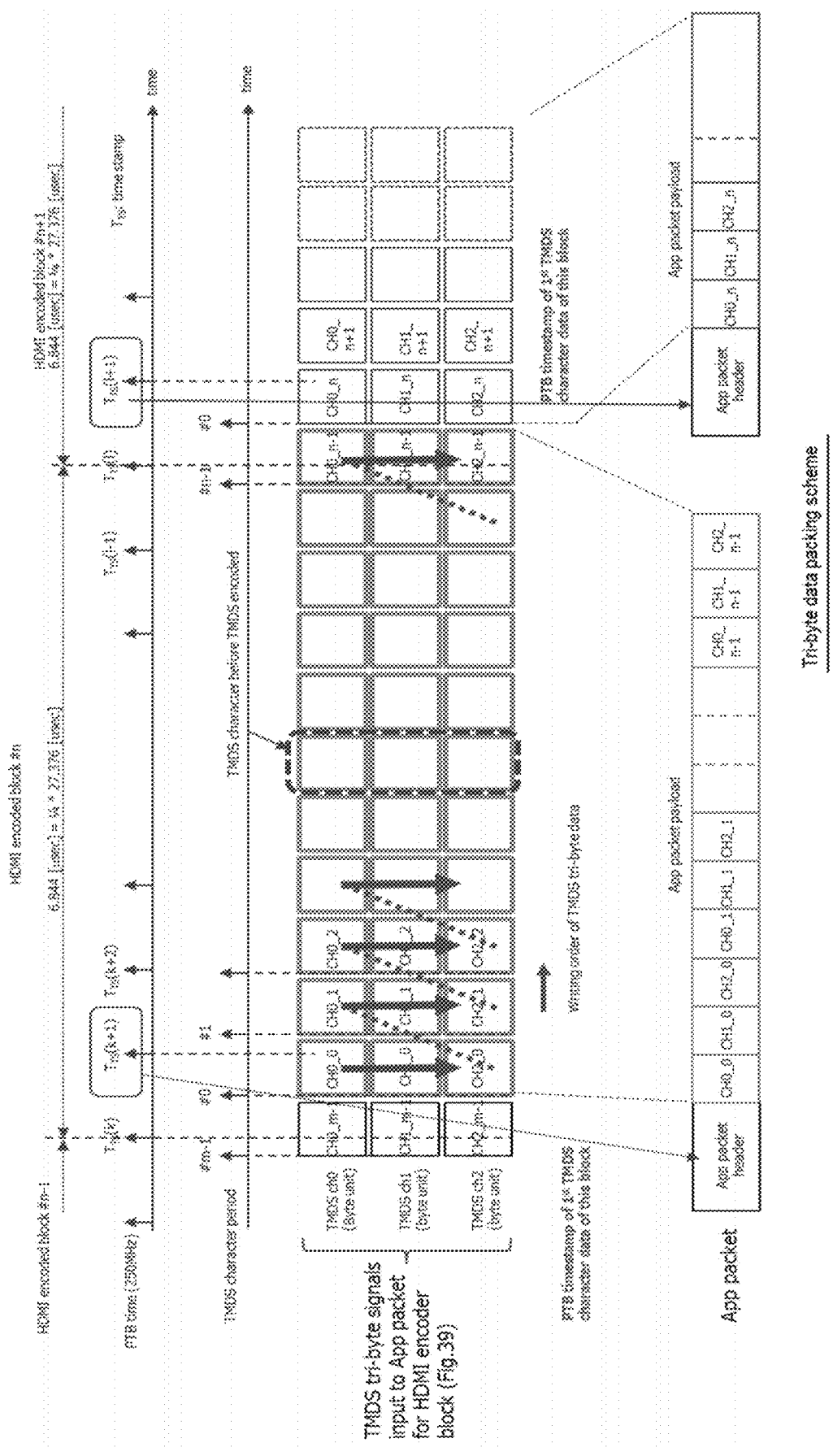
FIG. 46 is a diagram describing the transmission timing of a packet that includes a Try-byte signal.

FIG. 46 is a diagram describing the transmission timing of a packet that includes a Try-byte signal. As shown in FIG. 46, a TMDS character signal in units of three bytes in which 1-byte signals of TMDS Ch0, ch1, and ch2 are collectively included is input to the App packet for HDMI encoder 31$h$ for each TMDS character period. This TMDS character period is asynchronous with ASA TDD signals and ASA protocol signal processing.

As shown in FIG. 46, the App packet for HDMI encoder 31$h$ packs the input Tri-byte signal every 6.844 [used], which is a time period of one-fourth of the ASA TDD cycle (27.376 [used]), similarly to the packing of the TMDS/FRL signal.

The order of packing is the TMDS ch0, the TMDS ch1, and the TMDS ch2 of Tri-byte data input for each TMDS character period, and then, TMDS ch0, TMDS ch1, and TMDS ch2 of Tri-byte data input after the next TMDS character period. Packing is performed in this order.

This processing is repeated until the TMDS ch0, the TMDS ch1, and the TMDS ch2 input to the App packet for HDMI encoder 29$h$ at the time point when 6.844 [used], which is one-fourth of the ASA TDD cycle, elapsed are packed. Similarly to the packing of a TMDS signal or an FRL signal, the reference time when the first Tri-byte signal was input to the App packet for HDMI encoder 29$h$ is acquired as a timestamp and is stored in the App packet header of the App packet storing Tri-byte data.

This time stamp information is used for reproducing a TMDS character period on the reception side. Specifically, when the total number of TMDS character signals i.e., Tri-byte signals, included in all the App packets transmitted from time stamp information TTS(k+1) stored in the App packet header that transmits Tri-byte at a certain time point to time stamp information TTS(l+1) stored in the App packet header that transmits Tri-byte received after that is N, the TMDS character period can be obtained by the simple calculation shown in the following formula (4).

$$\text{TMDS character period} = (\text{TTS}(l+1) - \text{TTS}(k+1))/N \qquad (4)$$

Since the relationship between the TMDS character period, the TMDS clock, and the pixel clock frequency of a video stream being transmitted is defined in the HDMI 1.4b and HDMI 2.x standards, it is possible to calculate, when a TMDS character period can be acquired, a desired TMDS clock and pixel clock on the basis thereon.

Note that although each TMDS character period has been described above, the speed of the TMDS character period reaches several 100 MHz to several GHz, and therefore, the input speed may be reduced by inputting several TMDS character signals in parallel and performing parallel processing.

For example, six bytes of the TMDS characters CH0_0, CH1_0, CH2_0, CH0_1, CH1_1, and CH2_1 shown in FIG. 46 may be simultaneously input to the App packet for HDMI encoder 29$h$. As a result, TMDS characters are input in 6 byte units every time period of the TMDS character period ×2. Also in such a case, it is possible to pack and transmit a Tri-byte signal by the above-mentioned procedure.

Further, the application packet is divided as shown in FIG. 15, stored in the PHY data block of the ASA Down link, and transmitted.

Also in the case of transmitting the Tri-byte signal described in FIG. 45 and FIG. 46, the entire structure of the Application packet payload format shown in FIG. 36 can be used. That is, the Tri-byte signal shown in FIG. 46 is stored in the TMDS_FRL_data region shown in FIG. 36 and transmitted.

However, it is necessary to transmit identification information for transmitting the Tri-byte signal, the TB_TMDS_FRL_control shown in FIG. 47 is transmitted instead of the TMDS_FRL_control shown in FIG. 41. The TB_TMDS_FRL_control shown in FIG. 47 indicates, by the TB_TMDS_FRL_mode, whether it is the TMDS type, the FRL type, or the Tri-Byte mode of the TMDS_FRL_data transmitted by this App packet payload.

Further, the TB_TMDS_FRL_control shown in FIG. 47 transmits the packet size of the TB_TMDS_FRL_data transmitted by this App packet payload and the number of TMDS, FRL, or Tri-byte characters being transmitted. The reception side correctly decodes the TMDS, FRL, and Tri-byte by this field.

As described above, in the seventh embodiment, even in the case where the HDMI source device 24 transmits a Try-byte signal instead of a TMDS signal or an FML signal, it is possible to generate a packet that includes a Try-byte signal and transmit the packet between the SerDes (node 2) 22 and the SerDes (node 1) 21 for each time period of one-fourth of one TDD burst period conforming to the ASA standard.

It should be noted that the present technology may also take the following configurations.

(1) A communication apparatus, including:
  an encoder that generates a packet of a time division duplex (TDD) communication system, the packet including a high-definition multimedia interface (HDMI) signal; and
  a communication unit that transmits the packet to a communication partner device for each of a plurality of divided periods obtained by dividing one TDD burst period in the TDD communication system.

(2) The communication apparatus according to (1), in which
  the communication unit transmits the packet to the communication partner device every one of 6.844 [μsec], which is a time period obtained by dividing the one TDD burst period into four, and 3.422 [μsec], which is a time period obtained by dividing the one TDD burst period into eight.

(3) The communication apparatus according to (2), in which
  the encoder generates the packet that includes one of transition minimized differential signaling (TMDS) characters in units of 10 bits of a TMDS signal and fixed rate link (FRL) characters in units of 18 bits of an FRL signal
  (1) every divided time period of 6.844 [μsec], which is a time period obtained by dividing the one TDD burst period of an Automotive SerDes Alliance (ASA) standard into four, where a transmission capability of one of the TMDS signal and the FRL signal included in the HDMI signal is 24 [Gbps] or less, and
  (2) every divided time period of 3.422 [μsec], which is a time period obtained by dividing the one TDD burst period in the ASA standard into eight, where the transmission capability exceeds 24 [Gbps].

(4) The communication apparatus according to (3), in which
  the packet includes information regarding one of the number of the TMDS characters and the number of the FRL characters.

(5) The communication apparatus according to any one of (1) to (4), in which
  the communication unit transmits, where the HDMI signal includes a display data channel (DDC) signal, the packet that includes the DDC signal to the communication partner device in at least one of the plurality of divided periods in the one TDD burst period.

(6) The communication apparatus according to (5), in which
  a communication speed of the DDC signal included in the HDMI signal is 400 kbps or more.

(7) The communication apparatus according to any one of (1) to (4), in which
  the communication unit transmits, where the HDMI signal includes a consumer electronics control (CEC) signal, the packet that includes the CEC signal sampled in synchronization with a clock signal shared with the communication partner device to the communication partner device in at least one of the plurality of divided periods in the one TDD burst period.

(8) The communication apparatus according to (7), further including
  a decoder that decodes a packet including a response signal of the CEC signal transmitted from the communication partner device and returns, within 0.35 msec after an HDMI device that has transmitted the CEC signal transmits the CEC signal, the response signal to the HDMI device.

(9) The communication apparatus according to any one of (1) to (4), in which
  the communication unit transmits, where the HDMI signal includes a +5V signal, the packet that includes the +5V signal to the communication partner device in at least one of the plurality of divided periods in the one TDD burst period.

(10) The communication apparatus according to any one of (1) to (4), in which
  the communication unit transmits, where the HDMI signal includes an HDMI Ethernet Channel (HEC) signal, the packet that includes the HEC signal to the communication partner device in at least one of the plurality of divided periods in the one TDD burst period.

(11) The communication apparatus according to any one of (1) to (4), in which
  the communication unit transmits, where the HDMI signal includes a Try-byte signal, the packet that includes TMDS characters in units of 24 bits of the Try-byte signal to the communication partner device for each of the divided periods obtained by dividing the one TDD burst period into four.

(12) The communication apparatus according to (11), in which
  the communication unit transmits, where the HDMI signal includes the Try-byte signal, information regarding the number of TMDS characters to be transmitted in a unit time to the communication partner device for each of the divided periods obtained by dividing the one TDD burst period into four.

(13) The communication apparatus according to any one of (1) to (12), in which
  the encoder generates the packet in which a control signal group that includes an HPD signal, a DDC signal, and a CEC signal is disposed ahead of a data signal group that includes one of a TMDS signal and an FRL signal and an HEC signal.

(14) The communication apparatus according to (13), in which
  the encoder generates the packet in which an error detection code has been individually added to the control signal group, one of the TMDS signal and the FRL signal, and the HEC signal.

(15) A communication apparatus, including:
  a decoder that decodes an HDMI signal included in a first packet received from a communication partner device by a TDD communication system;
  an encoder that generates a second packet including a response signal to the communication partner device on the basis of the HDMI signal from the communication partner device; and a communication unit that transmits the second packet to the communication partner device for each TDD burst period in the TDD communication system.

(16) The communication apparatus according to (15), in which
the decoder decodes the HDMI signal included in the first packet received from the communication partner device by the TDD communication system, and reproduces a frequency of one of a TMDS clock and an FML clock on the basis of information regarding one of the number of TMDS characters and the number of FRL characters per unit time included in the decoded HDMI signal.

(17) The communication apparatus according to (15) or (16), in which
the decoder reproduces a TMDS character period where the decoded HDMI signal includes information regarding the number of TMDS characters per unit time.

(18) The communication apparatus according to any one of (15) to (17), in which
the communication unit transmits, where the HDMI signal decoded by the decoder includes a CEC signal, the second packet that includes a response signal to the CEC signal to the communication partner device such that an HDMI device connected to the communication partner device receives the response signal to the CEC signal within 0.35 [msec] after the HDMI device transmits the HDMI signal that includes the CEC signal to the communication partner device.

(19) The communication apparatus according to any one of (15) to (18), further including
a power source unit that supplies a +5V power signal to a reproducing device of the HDMI signal where the HDMI signal decoded by the decoder includes a +5V signal,
the encoder generating the second packet that includes a hot plug detect (HPD) signal where the HDMI signal decoded by the decoder includes the +5V power signal.

(20) The communication apparatus according to any one of (15) to (19), in which
the encoder generates, where the HDMI signal that includes an audio return channel (ARC) signal is transmitted to the communication partner device, the second packet that includes a sub-frame of four bytes including time slots 0 to 31, converts a preamble for transmitting the time slots 0 to 3 into a specific code of four bits, and inputs, to the time slot 4, a timestamp at which the ARC signal was input.

(21) A communication system, including:
a first communication apparatus; and
a second communication apparatus that alternately transmits/receives information to/from the first communication apparatus within a period assigned by a time division duplex (TDD) communication system,
the first communication apparatus including
an encoder that generates a first packet of the TDD communication system, the first packet including a high-definition multimedia interface (HDMI) signal, and
a communication unit that transmits the first packet to the second communication apparatus for each of a plurality of divided periods obtained by dividing one TDD burst period in the TDD communication system, the second communication apparatus including
a decoder that decodes an HDMI signal included in the first packet received from the first communication apparatus by the TDD communication system,
an encoder that generates a second packet including a response signal to the first communication apparatus on the basis of the HDMI signal from the first communication apparatus, and
a communication unit that transmits the second packet to the first communication apparatus for each TDD burst period of an Up link in the TDD communication system.

The aspects of the present disclosure are not limited to the above-mentioned individual embodiments and include various modifications that can be conceived by those skilled in the art, and the effects of the present disclosure are also not limited to the above-mentioned content. That is, various additions, modifications, and partial deletions can be made without departing the conceptual idea and essence of the present disclosure derived from the content defined in the claims and equivalents thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus, comprising:
an encoder that generates a packet of a time division duplex (TDD) communication system, the packet including a high-definition multimedia interface (HDMI) signal; and
a communication unit that transmits the packet to a communication partner device for each of a plurality of divided periods obtained by dividing one TDD burst period in the TDD communication system, wherein the plurality of divided periods are respectively a time period obtained by dividing the one TDD burst period into at least four.

2. The communication apparatus according to claim 1, wherein the communication unit transmits, where the HDMI signal includes a display data channel (DDC) signal, the packet that includes the DDC signal to the communication partner device in at least one of the plurality of divided periods in the one TDD burst period.

3. The communication apparatus according to claim 2, wherein a communication speed of the DDC signal included in the HDMI signal is 400 kbps or more.

4. The communication apparatus according to claim 1, wherein the communication unit transmits, where the HDMI signal includes a consumer electronics control (CEC) signal, the packet that includes the CEC signal sampled in synchronization with a clock signal shared with the communication partner device to the communication partner device in at least one of the plurality of divided periods in the one TDD burst period.

5. The communication apparatus according to claim 1, wherein the communication unit transmits, where the HDMI signal includes a +5V signal, the packet that includes the +5V signal to the communication partner device in at least one of the plurality of divided periods in the one TDD burst period.

6. The communication apparatus according to claim 1, wherein the communication unit transmits, where the HDMI signal includes an HDMI Ethernet Channel (HEC) signal, the packet that includes the HEC signal to the communication partner device in at least one of the plurality of divided periods in the one TDD burst period.

7. The communication apparatus according to claim 1, wherein the encoder generates the packet in which a control signal group that includes a hot plug detect (HPD) signal, a DDC signal, and a CEC signal is disposed ahead of a data signal group that includes one of a TMDS signal and an FRL signal and an HEC signal.

8. The communication apparatus according to claim 7, wherein the encoder generates the packet in which an error detection code has been individually added to the control signal group, one of the TMDS signal and the FRL signal, and the HEC signal.

9. A communication apparatus comprising:
an encoder that generates a packet of a time division duplex (TDD) communication system, the packet including a high-definition multimedia interface (HDMI) signal; and
a communication unit that transmits the packet to a communication partner device for each of a plurality of divided periods obtained by dividing one TDD burst period in the TDD communication system, wherein
the communication unit transmits the packet to the communication partner device every one of 6.844 [μsec], which is a time period obtained by dividing the one TDD burst period into four, and 3.422 [μsec], which is a time period obtained by dividing the one TDD burst period into eight.

10. The communication apparatus according to claim 9, wherein
the encoder generates the packet that includes one of transition minimized differential signaling (TMDS) characters in units of 10 bits of a TMDS signal and fixed rate link (FRL) characters in units of 18 bits of an FRL signal
(1) every divided time period of 6.844 [μsec], which is a time period obtained by dividing the one TDD burst period of an Automotive SerDes Alliance (ASA) standard into four, where a transmission capability of one of the TMDS signal and the FRL signal included in the HDMI signal is 24 [Gbps] or less, and
(2) every divided time period of 3.422 [μsec], which is a time period obtained by dividing the one TDD burst period in the ASA standard into eight, where the transmission capability exceeds 24 [Gbps].

11. The communication apparatus according to claim 10, wherein the packet includes information regarding one of a number of the TMDS characters and the number of the FRL characters.

12. A communication apparatus comprising:
an encoder that generates a packet of a time division duplex (TDD) communication system, the packet including a high-definition multimedia interface (HDMI) signal;
a communication unit that transmits the packet to a communication partner device for each of a plurality of divided periods obtained by dividing one TDD burst period in the TDD communication system,
wherein the communication unit transmits, where the HDMI signal includes a consumer electronics control (CEC) signal, the packet that includes the CEC signal sampled in synchronization with a clock signal shared with the communication partner device to the communication partner device in at least one of the plurality of divided periods in the one TDD burst period; and
a decoder that decodes a packet including a response signal of the CEC signal transmitted from the communication partner device and returns, within 0.35 msec after an HDMI device that has transmitted the CEC signal transmits the CEC signal, the response signal to the HDMI device.

13. A communication apparatus comprising:
an encoder that generates a packet of a time division duplex (TDD) communication system, the packet including a high-definition multimedia interface (HDMI) signal; and
a communication unit that transmits the packet to a communication partner device for each of a plurality of divided periods obtained by dividing one TDD burst period in the TDD communication system, wherein
the communication unit transmits, where the HDMI signal includes a Try-byte signal, the packet that includes TMDS characters in units of 24 bits of the Try-byte signal to the communication partner device for each of the divided periods obtained by dividing the one TDD burst period into four.

14. The communication apparatus according to claim 13, wherein the communication unit transmits, where the HDMI signal includes the Try-byte signal, information regarding a number of TMDS characters to be transmitted in a unit time to the communication partner device for each of the divided periods obtained by dividing the one TDD burst period into four.

15. A communication apparatus, comprising:
a decoder that decodes a high-definition multimedia interface (HDMI) signal included in a first packet received from a communication partner device by a time division duplex (TDD) communication system;
an encoder that generates a second packet including a response signal to the communication partner device on a basis of the HDMI signal from the communication partner device; and
a communication unit that transmits the second packet to the communication partner device for each TDD burst period in the TDD communication system, wherein
the decoder decodes the HDMI signal included in the first packet received from the communication partner device by the TDD communication system, and reproduces a frequency of one of a transition minimized differential signaling (TMDS) clock and an FML clock on a basis of information regarding one of a number of TMDS characters and a number of fixed rate link (FRL) characters per unit time included in the decoded HDMI signal.

16. The communication apparatus according to claim 15, further comprising
a power source unit that supplies a +5V power signal to a reproducing device of the HDMI signal where the HDMI signal decoded by the decoder includes a +5V signal,
the encoder generating the second packet that includes a hot plug detect (HPD) signal where the HDMI signal decoded by the decoder includes the +5V power signal.

17. A communication apparatus, comprising:
a decoder that decodes a high-definition multimedia interface (HDMI) signal included in a first packet received from a communication partner device by a time division duplex (TDD) communication system;
an encoder that generates a second packet including a response signal to the communication partner device on a basis of the HDMI signal from the communication partner device; and a communication unit that transmits the second packet to the communication partner device for each TDD burst period in the TDD communication system, wherein the decoder reproduces a transition minimized differential signaling (TMDS) character period where the decoded HDMI signal includes information regarding a number of TMDS characters per unit time.

18. A communication apparatus, comprising:

a decoder that decodes a high-definition multimedia interface (HDMI) signal included in a first packet received from a communication partner device by a time division duplex (TDD) communication system;

an encoder that generates a second packet including a response signal to the communication partner device on a basis of the HDMI signal from the communication partner device; and a communication unit that transmits the second packet to the communication partner device for each TDD burst period in the TDD communication system, wherein the communication unit transmits, where the HDMI signal decoded by the decoder includes a consumer electronics control (CEC) signal, the second packet that includes a response signal to the CEC signal to the communication partner device such that an HDMI device connected to the communication partner device receives the response signal to the CEC signal within 0.35 [msec] after the HDMI device transmits the HDMI signal that includes the CEC signal to the communication partner device.

19. A communication apparatus, comprising:

a decoder that decodes a high-definition multimedia interface (HDMI) signal included in a first packet received from a communication partner device by a time division duplex (TDD) communication system;

an encoder that generates a second packet including a response signal to the communication partner device on a basis of the HDMI signal from the communication partner device; and a communication unit that transmits the second packet to the communication partner device for each TDD burst period in the TDD communication system, wherein the encoder generates, where the HDMI signal that includes an audio return channel (ARC) signal is transmitted to the communication partner device, the second packet that includes a sub-frame of four bytes including time slots 0 to 31, converts a preamble for transmitting the time slots 0 to 3 into a specific code of four bits, and inputs, to the time slot 4, a timestamp at which the ARC signal was input.

* * * * *